(12) United States Patent
Liu et al.

(10) Patent No.: US 10,951,116 B2
(45) Date of Patent: *Mar. 16, 2021

(54) VOLTAGE REGULATOR WITH NONLINEAR ADAPTIVE VOLTAGE POSITION AND CONTROL METHOD THEREOF

(71) Applicant: Monolithic Power Systems, Inc., San Jose, CA (US)

(72) Inventors: Chao Liu, Sunnyvale, CA (US); Daocheng Huang, Santa Clara, CA (US); Cong Deng, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 16/367,179

(22) Filed: Mar. 27, 2019

(65) Prior Publication Data

US 2019/0305674 A1    Oct. 3, 2019

Related U.S. Application Data

(63) Continuation-in-part of application No. 15/938,936, filed on Mar. 28, 2018, now Pat. No. 10,498,234.

(51) Int. Cl.
*H02M 3/156* (2006.01)
*H02M 3/158* (2006.01)
*H02M 1/00* (2006.01)

(52) U.S. Cl.
CPC .......... *H02M 3/156* (2013.01); *H02M 3/1584* (2013.01); *H02M 2001/0025* (2013.01)

(58) Field of Classification Search
CPC .......................................... H02M 3/155–1588
See application file for complete search history.

(56) References Cited

U.S. PATENT DOCUMENTS

| 5,306,235 | A | 4/1994 | Haynes |
| 6,285,139 | B1 | 9/2001 | Ghanem |
| 7,317,306 | B2 | 1/2008 | Fite |
| 8,395,368 | B2 | 3/2013 | Ouyang |
| 8,674,674 | B1 * | 3/2014 | Abu Qahouq ........ H02M 3/158 323/283 |
| 9,473,027 | B2 | 10/2016 | Dong |
| 2012/0153055 | A1 | 6/2012 | Imai et al. |

* cited by examiner

*Primary Examiner* — Peter M Novak
(74) *Attorney, Agent, or Firm* — Perkins Coie LLP

(57) ABSTRACT

A voltage regulator has a switching circuit and a control circuit. The switching circuit provides an output voltage and an output current. The control circuit provides a switching control signal to the switching circuit to adjust the output voltage, such that the output voltage decreases with a first slope as the output current increases when the output current is less than a predetermined current, the output voltage decreases with a second slope as the output current increases when the output current is larger than the predetermined current.

18 Claims, 22 Drawing Sheets

VOLTAGE REGULATOR WITH NONLINEAR ADAPTIVE VOLTAGE POSITION AND CONTROL METHOD THEREOF

CROSS-REFERENCE TO RELATED APPLICATIONS

This application is a continuation-in-part of U.S. patent application Ser. No. 15/938,936, filed on Mar. 28, 2018.

TECHNICAL FIELD

The present invention generally relates to electronic circuits, and more particularly, relates to voltage regulators with adaptive voltage position and control methods thereof.

BACKGROUND

In high current voltage regulators used in laptop, desktop, server and telecom applications, adaptive voltage position (AVP) control is widely used to achieve good transient performance and reduce load power consumption. FIG. 1A illustrates the basic principle of AVP control, wherein Vout represents an output voltage of a voltage regulator, Iout represents an output current of the voltage regulator and Vref represents a reference voltage. As shown in FIG. 1A, output voltage Vout linearly decreases within a voltage tolerance window (Vmax-Vmin) as output current Iout increases, where Vmax is a permitted maximum output voltage, and Vmin is a permitted minimum output voltage.

FIG. 1B compares load transient response of voltage regulators with and without AVP control. As shown in the figure, for voltage regulators without AVP control, because of undershoot and overshoot at the output voltage Vout during load transient period, only half of the voltage tolerance window can be used. While in voltage regulators with AVP control, output voltage Vout is controlled to be slightly higher than permitted minimum output voltage Vmin at full load, and a little bit lower than permitted maximum output voltage Vmax at light load. As a result, the entire voltage tolerance window can be used during load transient period, which allows a smaller output capacitor in the voltage regulator. Furthermore, since output voltage Vout with AVP control decreases as the output current Iout increases, the output power at full load is degraded, which greatly facilitates the thermal design.

However, with fast development of electronic devices, higher and higher power is pushed on voltage regulators. The traditional AVP control may be not enough to achieve both fast transient response and safety operation within the voltage tolerance window.

SUMMARY

The embodiments of the present invention are directed to a control circuit for a voltage regulator, the voltage regulator is configured to receive an input voltage and provide an output voltage and an output current, the control circuit comprising: a voltage generator, configured to receive a first signal with a first slope, a second signal with a second slope, the input voltage and the output voltage, and is further configured to provide a first feedback signal in response to the output voltage, the output current and the first signal with the first slope, and configured to provide a second feedback signal in response to the output voltage, the output current and the second signal with the second slope; a compare circuit, configured to provide a first comparison signal by comparing the first feedback signal with a first reference signal, and configured to provide a second comparison signal by comparing the second feedback signal with a second reference signal; and a logic circuit, configured to generate a set signal based on the first comparison signal and the second comparison signal; wherein the control circuit is configured to adjust the output voltage based on the set signal, such that the output voltage decreases with the first slope as the output current increases when the output current is less than a predetermined current, and the output voltage decreases with the second slope as the output current increases when the output current is larger than the predetermined current.

The embodiments of the present invention are also directed to a voltage regulator, comprising: a switching circuit, configured to receive an input voltage and provide an output voltage and an output current; a nonlinear AVP control circuit, configured to provide a set signal in response to the output voltage, the output current, a first signal with a first slope and a second signal with a second slope; and a switching control circuit, configured to provide a switching control signal to turn on the switching circuit based on the set signal to adjust the output voltage, such that the output voltage decreases with the first slope as the output current increases when the output current is less than a predetermined current, and the output voltage decreases with the second slope as the output current increases when the output current is larger than the predetermined current.

The embodiments of the present invention are further directed to a control method used in a voltage regulator, the voltage regulator is configured to receive an input voltage and provide an output voltage and an output current, the control method comprising: sensing the output current and the output voltage; generating a first feedback signal in response to the output voltage, the output current and a first signal with a first slope, and generating a first comparison signal by comparing the first feedback signal with a first reference voltage; generating a second feedback signal in response to the output voltage, the output current and a second signal with a second slope, and generating a second comparison signal by comparing the second feedback signal with a second reference voltage; generating a set signal based on the first comparison signal and the second comparison signal; and adjusting the output voltage based on the set signal, such that the output voltage decreases with the first slope as the output current increases when the output current is less than a predetermined current, and the output voltage decreases with the second slope as the output current increases when the output current is larger than the predetermined current.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

FIGS. 2A-2D illustrate principle of nonlinear adaptive voltage position (AVP) control in accordance with embodiments of the present invention. In FIGS. 2A-2D, the X-axis represents an output current Iout, and the Y-axis represents an output voltage Vout. Line 201 characterizes a voltage regulator with traditional AVP control scheme, which varies output voltage Vout as a linear function of output current Iout. Output voltage Vout is set at a reference voltage Vref when load is idle, that is output current Iout is at a minimum current level I(0), where reference voltage Vref is a little lower than a permitted maximum output voltage Vmax. In one embodiment, reference voltage Vref is provided based on a voltage identification (VID) code from a processor load. Line 201 shows that output voltage Vout decreases with a linear slope as output current Iout increases. Output voltage Vout is regulated slightly above a permitted minimum output voltage Vmin with a voltage droop when load is full, that is output current Iout is at a maximum current level I(max). Under traditional AVP control scheme, unexpected shutdown of the processor load per under voltage of output voltage Vout may happen when output current Iout dramatically increases to maximum current level I(max). The present invention provides a solution to this problem by use of a nonlinear AVP control scheme as is shown by example of curve 202 in FIGS. 2A-2D.

Figure 1A:
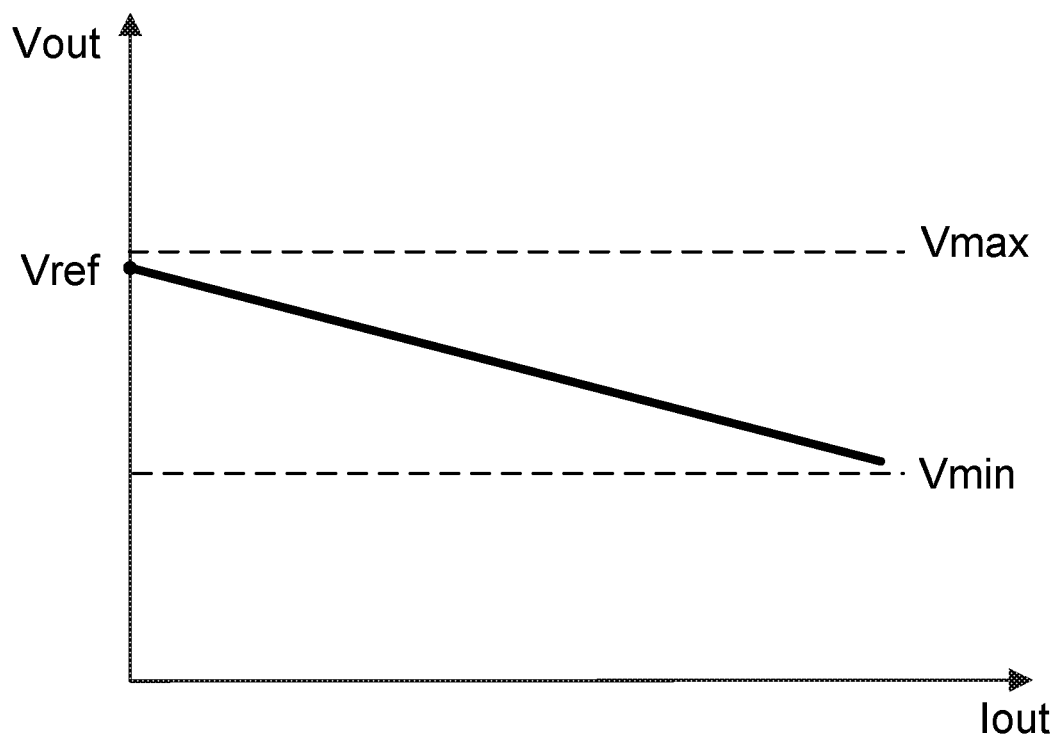
FIG. 1A illustrates the basic principle of AVP control.
Figure 1B:
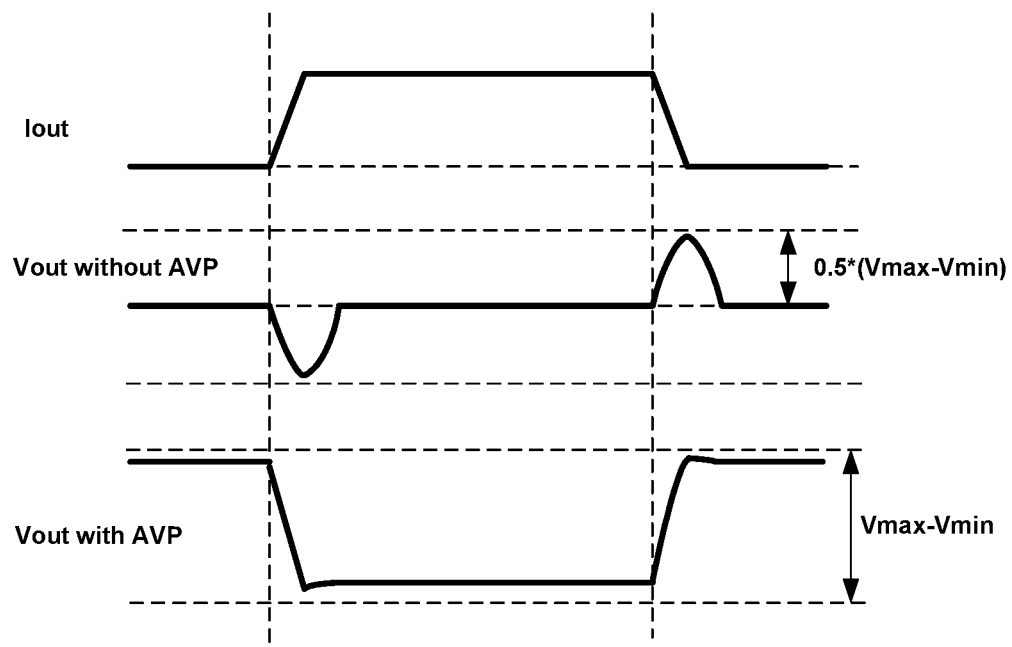
FIG. 1B illustrates waveforms of voltage regulators with and without AVP control during load transient period.
Figure 2A:
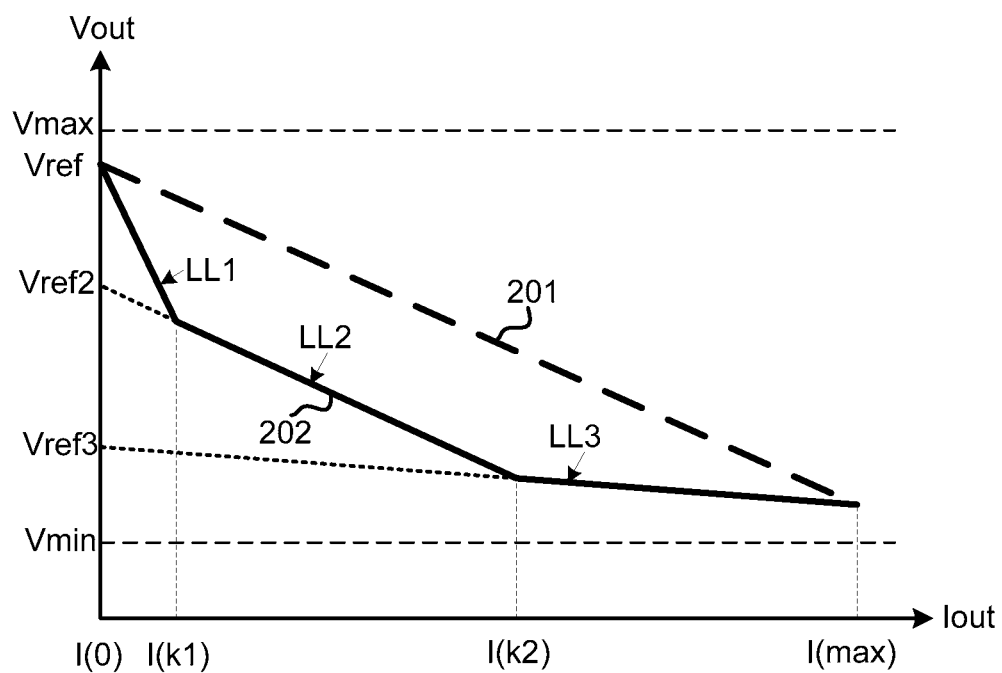
FIGS. 2A-2D illustrate principle of nonlinear AVP control in accordance with embodiments of the present invention.

Curve 202 in FIG. 2A shows a three-stage nonlinear AVP control scheme in accordance with an embodiment of the present invention. Output voltage Vout is regulated at reference voltage Vref when output current Iout is at minimum current level I(0), and output voltage Vout is regulated slightly above permitted minimum output voltage Vmin when output current Iout is at maximum current level I(max). In FIG. 2A, when output current Iout is larger than minimum current level I(0) and is less than a current level I(k1), output voltage Vout decreases with a slope LL1 as output current Iout increases, and the relationship between output voltage Vout and output current Iout can be expressed as:

$$Vout=Vref-LL1*Iout \qquad (1)$$

When output current Iout is larger than current level I(k1), and is less than a current level I(k2), output voltage Vout decreases with a slope LL2 as output current Iout increases, and the relationship between output voltage Vout and output current Iout can be expressed as:

$$Vout=Vref2-LL2*Iout \qquad (2)$$

where Vref2 represents a reference voltage which is lower than reference voltage Vref, and slope LL2 is smaller than slope LL1.

When output current Iout is larger than current level I(k2), and is less than maximum current level I(max), output voltage Vout decreases with a slope LL3 as output current Iout increases, and the relationship between output voltage Vout and output current Iout can be expressed as:

$$Vout=Vref3-LL3*Iout \qquad (3)$$

where Vref3 represents a reference voltage which is lower than reference voltage Vref2, and slope LL3 is smaller than slope LL2. As shown in FIG. 2A, slope LL3 is quite small, and output voltage Vout decreases a little to avoid unexpected system shutdown as output current Iout increases when output current Iout is larger than current level I(k2). As a result, safety operation at full load condition is ensured.

Continuing with FIG. 2A, due to the nonlinear AVP control scheme, output voltage Vout can be set high enough at small output current Iout to reduce under shoot at fast load step up, so that enough headroom is ensured for safety operation. Furthermore, it can be seen that output voltage Vout following curve 202 is lower than the one following curve 201 within the whole load range, so power loss is reduced.

Figure 2B:
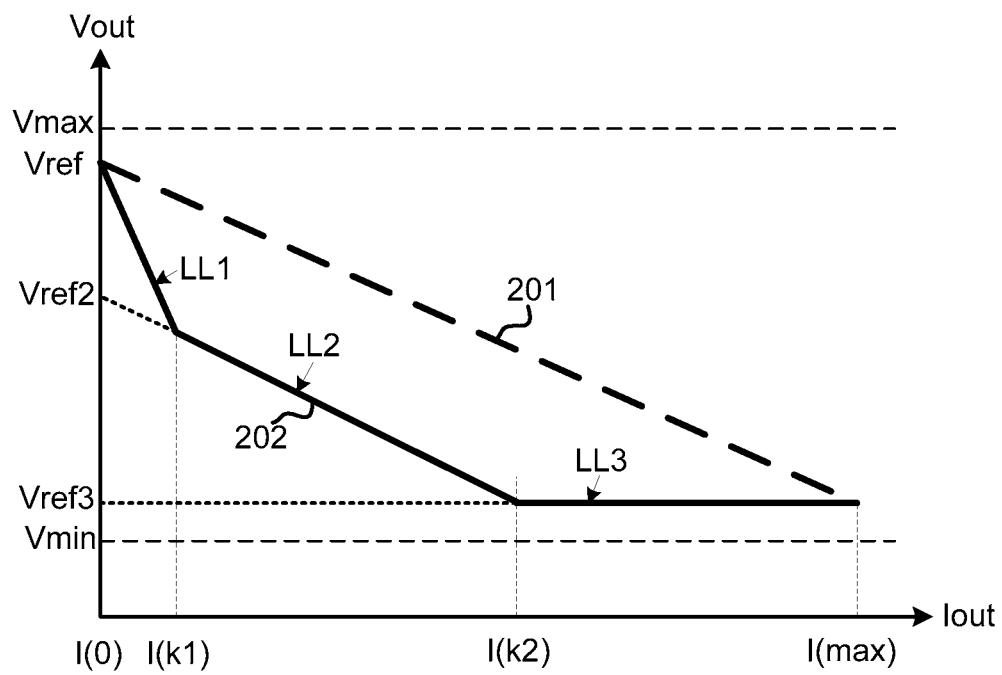

Curve 202 in FIG. 2B shows a three-stage nonlinear AVP control scheme in accordance with another embodiment of the present invention. The difference between curve 202 in FIG. 2B and FIG. 2A is that slope LL3 of curve 202 in FIG. 2B is zero. So output voltage Vout keeps at reference voltage Vref3 when output current Iout is larger than current level I(k2).

Figure 2C:
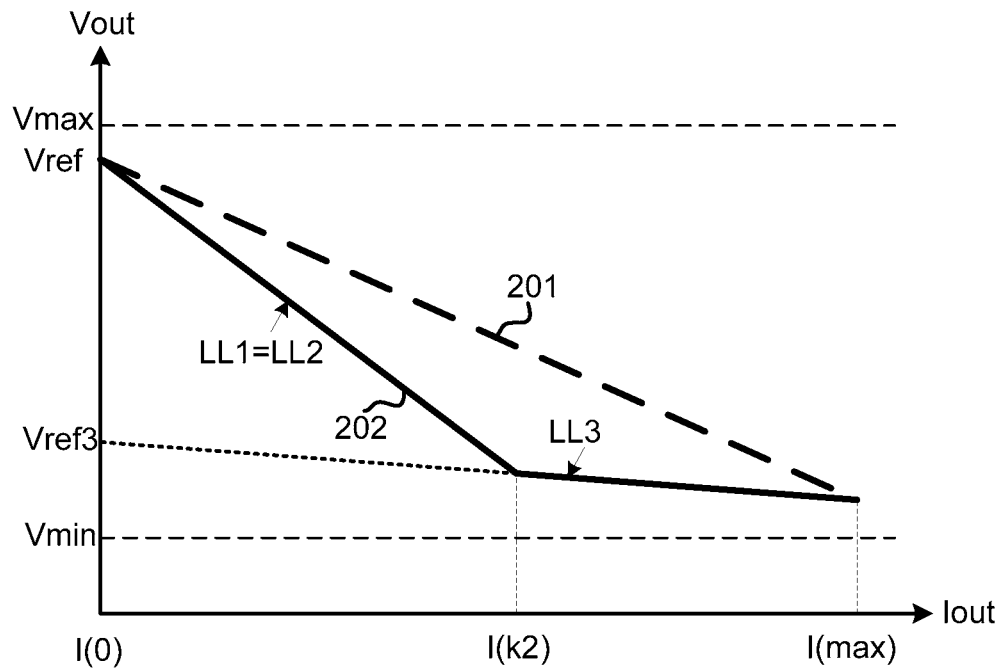

Curve 202 in FIG. 2C shows a two-stage nonlinear AVP control scheme in accordance with an embodiment of the present invention. The difference between curve 202 in FIG. 2C and FIG. 2A is that slope LL2 equals slope LL1 in FIG. 2C.

Figure 2D:
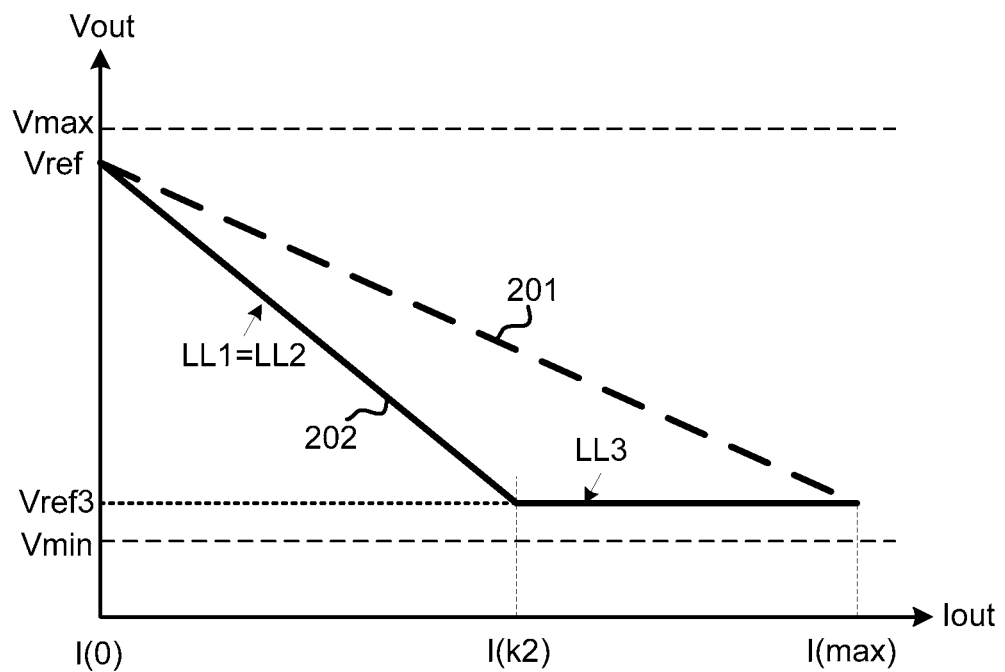

Curve 202 in FIG. 2D shows a two-stage nonlinear AVP control scheme in accordance with another embodiment of the present invention. The difference between curve 202 in FIG. 2D and FIG. 2C is that slope LL3 in FIG. 2D is zero. So output voltage Vout keeps at reference voltage Vref3 when output current Iout is larger than current level I(k2).

Figure 3:
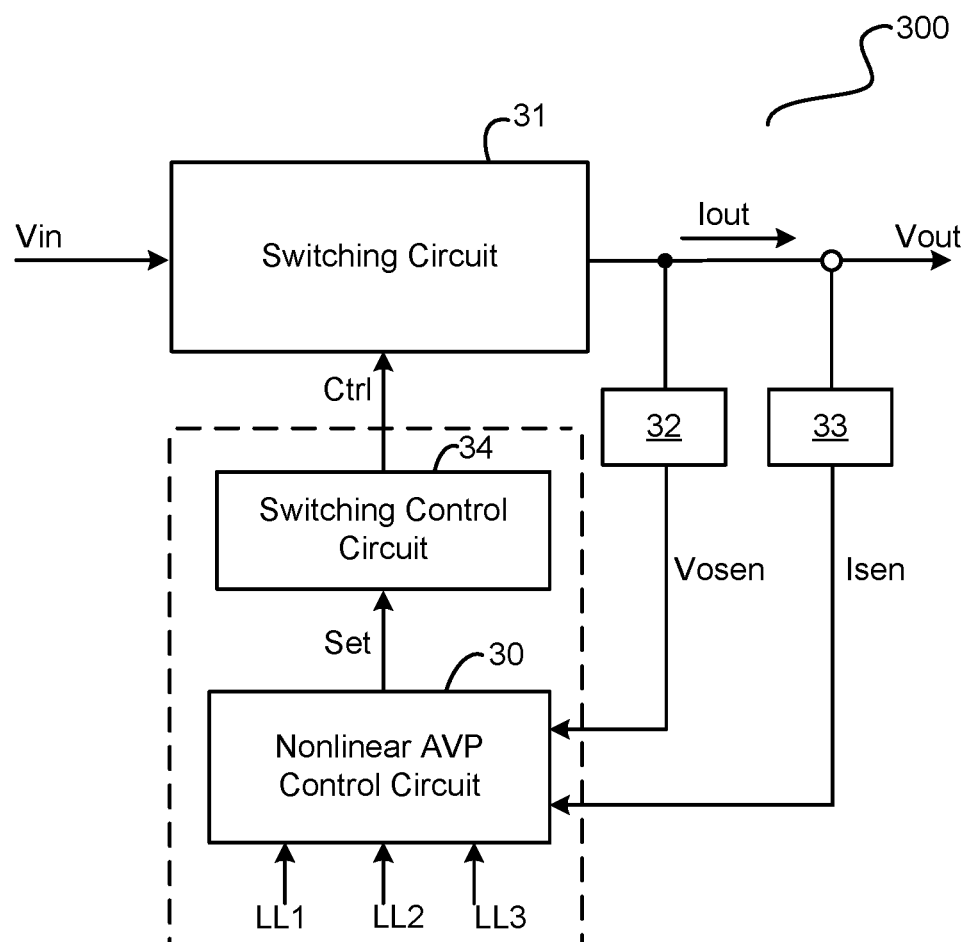
FIG. 3 schematically illustrates a voltage regulator 300 in accordance with an embodiment of the present invention.

FIG. 3 schematically illustrates a voltage regulator 300 in accordance with an embodiment of the present invention. Voltage regulator 300 comprises a switching circuit 31, a voltage sense circuit 32, a current sense circuit 33, and a control circuit comprising a nonlinear AVP control circuit 30 and a switching control circuit 34.

Switching circuit 31 is configured to receive an input voltage Vin and provide output voltage Vout and output current Iout. Voltage sense circuit 32 is configured to sense output voltage Vout and provide a voltage sense signal Vosen based on output voltage Vout. Current sense circuit 33 is configured to sense output current Iout and provide a current sense signal Isen based on output current Iout.

The control circuit is configured to provide a switching control signal Ctrl to switching circuit 31 to adjust output voltage Vout, such that output voltage Vout decreases with slope LL1 as output current Iout increases when output current Iout is less than current level I(k1), output voltage Vout decreases with slope LL2 as output current Iout increases when output current Iout is larger than current level I(k1) and is less than current level I(k2), and output voltage Vout decreases with slope LL3 as output current Iout increases when output current Iout is larger than current level I(k2).

Nonlinear AVP control circuit 30 is configured to receive voltage sense signal Vosen, current sense signal Isen, slopes LL1, LL2, and LL3, and is configured to provide a set signal Set according to output voltage Vout, output current Iout, slopes LL1, LL2 and LL3.

Switching control circuit 34 is configured to receive set signal Set from nonlinear AVP control circuit 30, and is configured to provide switching control signal Ctrl to turn ON switching circuit 31 in response to set signal Set.

Figure 4A:
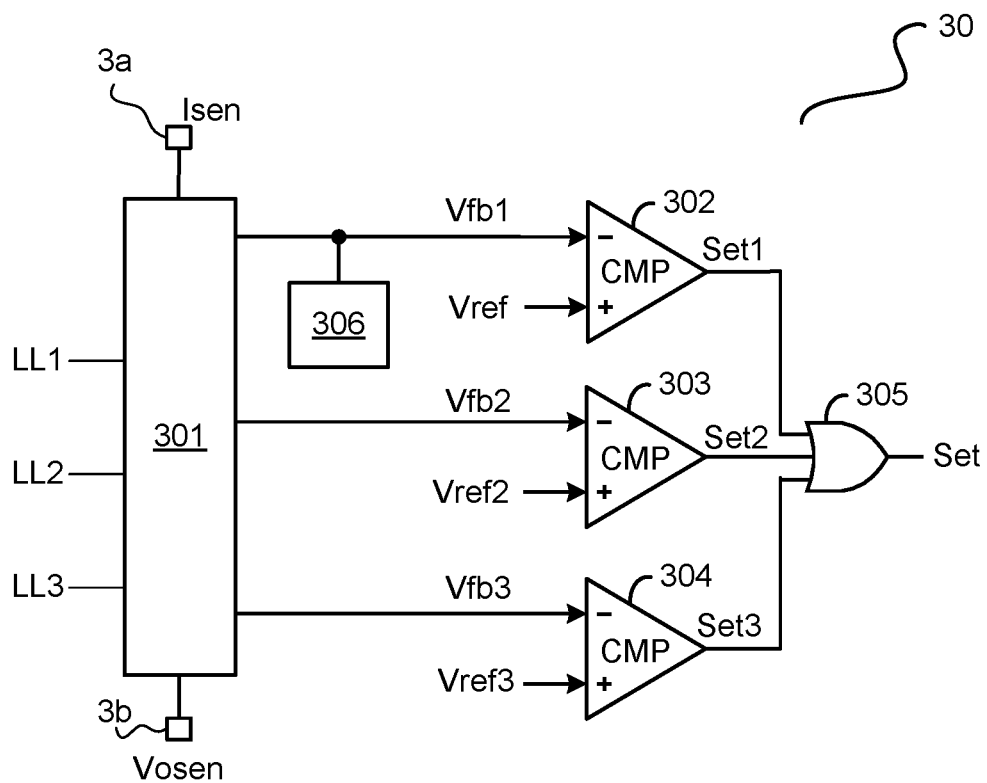
FIG. 4A schematically illustrates a nonlinear AVP control circuit 30 in accordance with an embodiment of the present invention.

FIG. 4A schematically illustrates nonlinear AVP control circuit 30 in accordance with an embodiment of the present invention. Nonlinear AVP control circuit 30 comprises a voltage generator 301, a comparator 302, a comparator 303, a comparator 304, and a logic circuit 305.

A node 3a of voltage generator 301 is coupled to current sense circuit 33 shown in FIG. 3 to receive current sense signal Isen, a node 3b of voltage generator 301 is coupled to voltage sense circuit 32 shown in FIG. 3 to receive voltage sense signal Vosen, and voltage generator 301 is configured to provide feedback signals Vfb1, Vfb2 and Vfb3 respectively.

Voltage generator 301 is configured to provide feedback signal Vfb1 in response to output voltage Vout, output current Iout, and slope LL1. In one embodiment, feedback signal Vfb1 can be expressed as:

$$Vfb1 = Vosen + Iout*LL1 \qquad (4)$$

Voltage generator 301 is configured to provide feedback signal Vfb2 in response to output voltage Vout, output current Iout, and slope LL2. In one embodiment, feedback signal Vfb2 can be expressed as:

$$Vfb2 = Vosen + Iout*LL2 \qquad (5)$$

Voltage generator 301 is configured to provide feedback signal Vfb3 in response to output voltage Vout, output current Iout, and slope LL3. In one embodiment, feedback signal Vfb3 can be expressed as:

$$Vfb3 = Vosen + Iout*LL3 \qquad (6)$$

Comparator 302 has an inverting terminal coupled to voltage generator 301 to receive feedback signal Vfb1, a non-inverting terminal configured to receive reference voltage Vref which is used to set output voltage Vout, and an output terminal configured to provide a comparison signal Set1 by comparing the feedback signal Vfb1 with the reference voltage Vref. In one embodiment, feedback signal Vfb1 and/or reference voltage Vref may comprise other signals such as a slope compensation signal.

Comparator 303 has an inverting terminal coupled to voltage generator 301 to receive feedback signal Vfb2, a non-inverting terminal configured to receive a reference voltage Vref2, and an output terminal configured to provide a comparison signal Set2 by comparing the feedback signal Vfb2 with the reference voltage Vref2. In one embodiment, feedback signal Vfb2 and/or reference voltage Vref2 may comprise other signals such as a slope compensation signal.

Comparator 304 has an inverting terminal coupled to voltage generator 301 to receive feedback signal Vfb3, a non-inverting terminal configured to receive a reference voltage Vref3, and an output terminal configured to provide a comparison signal Set3 by comparing the feedback signal Vfb3 with reference voltage Vref3. In one embodiment, feedback signal Vfb3 and/or reference voltage Vref2 may comprise other signals such as a slope compensation signal.

Logic circuit 305 is coupled to output terminals of comparators 302, 303 and 304 to receive comparison signals Set1, Set2 and Set3, and is configured to provide set signal Set based on comparison signals Set1, Set2 and Set3. In one embodiment, set signal Set is configured to turn ON switching circuit 31 when any of the comparison signals Set1, Set2 and Set3 is at logic high. In one embodiment, logic circuit 305 comprises an OR gate.

Nonlinear AVP control circuit 30 further comprises a compensator 306 to dynamically adjust slope LL1 during load transient period, such that slope LL1 dynamically decreases when output current Iout increases from less than current level I(k1). As a result, voltage droop of output voltage Vout is reduced to ensure safety operation when output current Iout dramatically increases from less than current level I(k1). In one embodiment, compensator 306 is configured to generate a droop voltage Vdroop in response to output current Iout, and further configured to provide a compensation signal to feedback signal Vfb1 via filtering droop voltage Vdroop, thus the compensation signal is sensitive to fast variation of output current Iout.

Figure 4B:
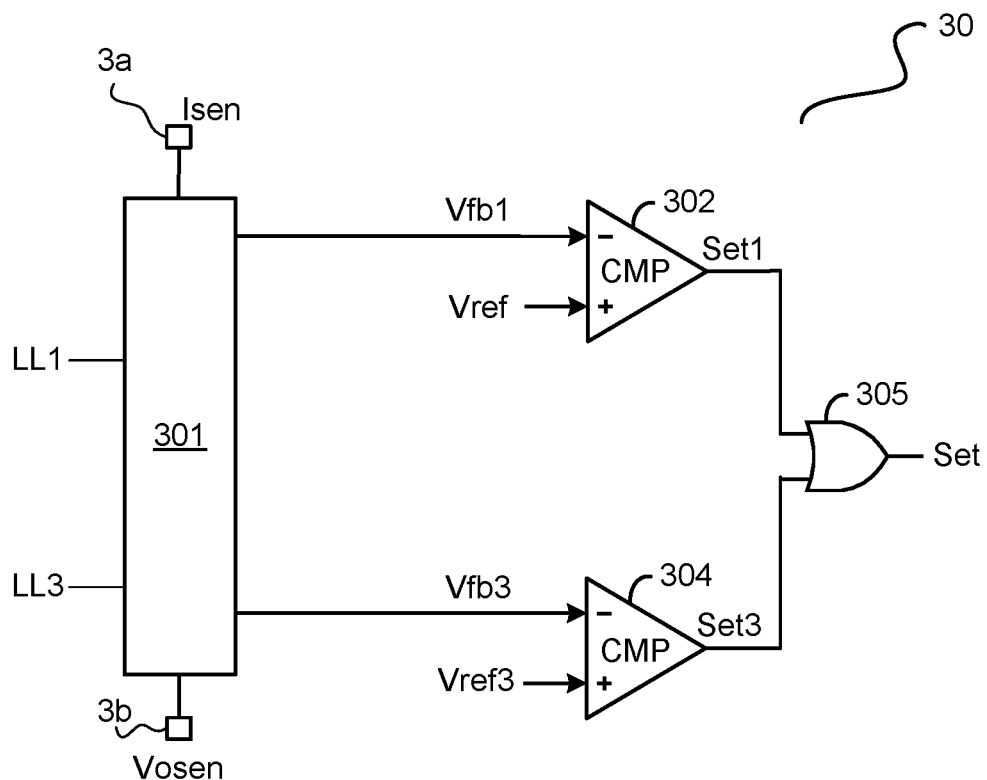
FIG. 4B schematically illustrates a nonlinear AVP control circuit 30 in accordance with another embodiment of the present invention.

In one embodiment, if slope LL1 equals slope LL2 at steady state, then feedback signal Vfb1 equals feedback signal Vfb2, and comparator 303 is disabled corresponding to two-stage nonlinear AVP control scheme shown in FIG. 2C and FIG. 2D. FIG. 4B schematically illustrates nonlinear AVP control circuit 30 implementing two-stage nonlinear AVP control scheme in accordance with an embodiment of the present invention. The embodiment shown in FIG. 4B has voltage generator 301, comparator 302, comparator 304 and logic circuit 305 similarly as FIG. 4A.

Figure 5:
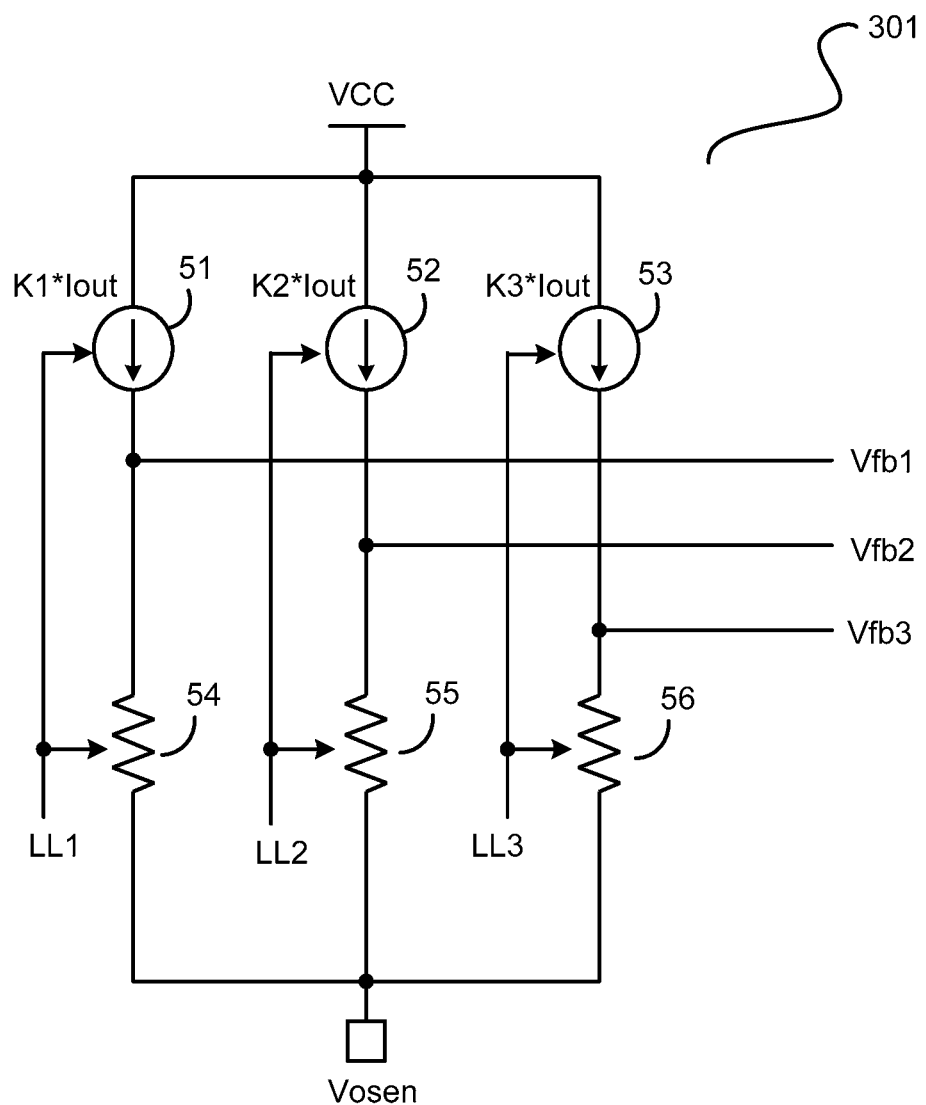
FIG. 5 schematically illustrates a voltage generator 301 in accordance with an embodiment of the present invention.

FIG. 5 schematically illustrates voltage generator 301 in accordance with an embodiment of the present invention. In FIG. 5, voltage generator 301 comprises controllable current sources 51, 52 and 53, and resistors 54, 55 and 56.

Controllable current source 51 is configured to provide a current K1*Iout which is proportional to output current Iout, current K1*Iout flows through resistor 54 to provide feedback signal Vfb1. Resistor 54 has a first terminal coupled to controllable current source 51 and a second terminal coupled to receive voltage sense signal Vosen. Coefficient K1 and a resistance R54 of resistor 54 are controlled based on slope LL1 to satisfy equation (4), that is:

$$K1*R54=LL1 \quad (7)$$

Controllable current source 52 is configured to provide a current K2*Iout which is proportional to output current Iout, current K2*Iout flows through resistor 55 to provide feedback signal Vfb2. Resistor 55 has a first terminal coupled to controllable current source 52 and a second terminal coupled to receive voltage sense signal Vosen. Coefficient K2 and a resistance R55 of resistor 55 are controlled based on slope LL2 to satisfy equation (5), that is:

$$K2*R55=LL2 \quad (8)$$

Controllable current source 53 is configured to provide a current K3*Iout which is proportional to output current Iout, current K3*Iout flows through resistor 56 to provide feedback signal Vfb3. Resistor 56 has a first terminal coupled to controllable current source 53 and a second terminal coupled to receive voltage sense signal Vosen. Coefficient K3 and a resistance R56 of resistor 56 are controlled based on slope LL3 to satisfy equation (6), that is:

$$K3*R56=LL3 \quad (9)$$

In one embodiment, current sources 51, 52 and 53 are adjustable, that is coefficients K1, K2 and K3 are adjustable to satisfy different requirements of slopes LL1, LL2 and LL3, and resistances R54, R55 and R56 are predetermined. In one embodiment, resistances R54, R55 and R56 are adjustable to satisfy different requirements of slopes LL1, LL2 and LL3, and coefficients K1, K2 and K3 are predetermined. In one embodiment, current sources 51, 52 and 53 are adjustable, that is coefficients K1, K2 and K3 are adjustable, and resistances R54, R55 and R56 are adjustable, to satisfy different requirements of slopes LL1, LL2 and LL3.

Figure 6:
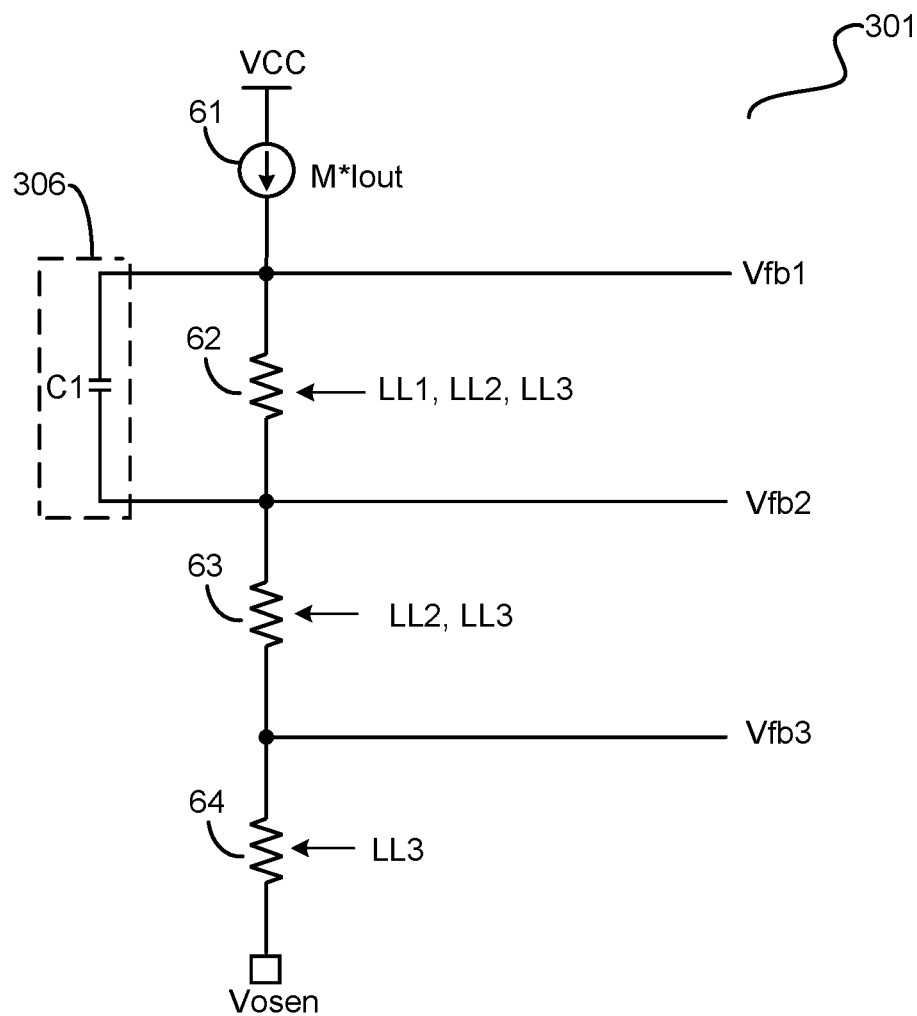
FIG. 6 schematically illustrates voltage generator 301 in accordance with another embodiment of the present invention.

FIG. 6 schematically illustrates voltage generator 301 in accordance with another embodiment of the present invention. In FIG. 6, voltage generator 301 comprises a controllable current source 61, resistors 62, 63 and 64, which are coupled in series. Controllable current source 61 is configured to provide a current M*Iout which is proportional to output current Iout. Resistor 62 has a first terminal coupled to controllable current source 61 to receive current M*Iout and a second terminal, wherein feedback signal Vfb1 is provided at the first terminal of resistor 62, and a resistance R62 of resistor 62 is controlled in response to slope LL1, slope LL2 and slope LL3, e.g., R1=(LL1−LL2)/M. Resistor 63 has a first terminal coupled to the second terminal of resistor 62 and a second terminal, wherein feedback signal Vfb2 is provided at the first terminal of resistor 63, and a resistance R63 of resistor 63 is controlled in response to slope LL2 and slope LL3, e.g., R2=(LL2−LL3)/M. Resistor 64 has a first terminal coupled to the second terminal of resistor 63 and a second terminal configured to receive voltage sense signal Vosen, wherein feedback signal Vfb3 is provided at the first terminal of resistor 64, and a resistance R64 of resistor 64 is controlled in response to slope LL3, e.g., R3=LL3/M.

In one embodiment as shown in FIG. 6, compensator 306 comprises a capacitor C1 coupled in parallel with resistor 62. Droop voltage Vdroop is generated across resistor 62 and capacitor C1, capacitor C1 filters droop voltage Vdroop to compensate feedback signal Vfb1, so that slope LL1 in practical decreases when output current Iout dramatically increases from less than current I(k1).

Figure 7:
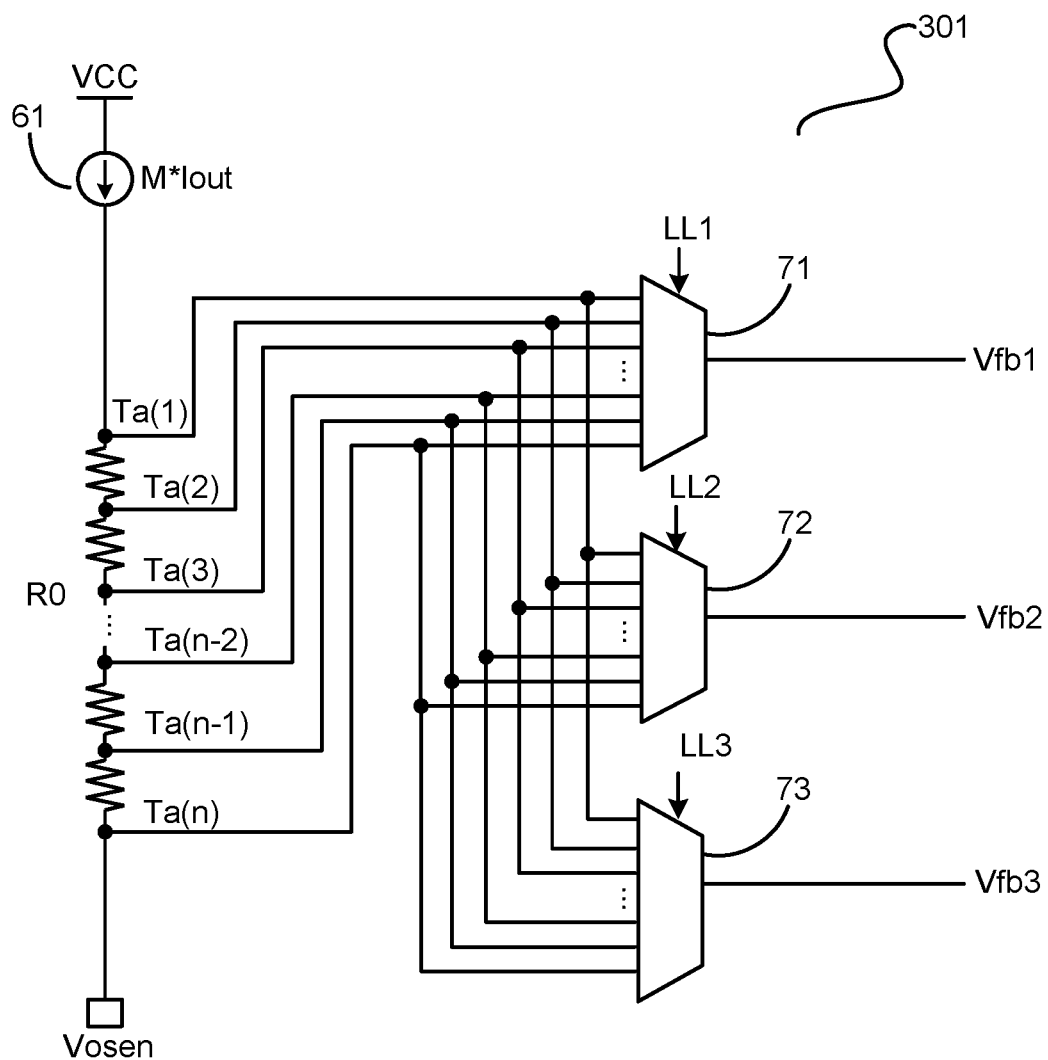
FIG. 7 schematically illustrates voltage generator 301 in accordance with another embodiment of the present invention.

FIG. 7 schematically illustrates voltage generator 301 in accordance with another embodiment of the present invention. In FIG. 7, voltage generator 301 comprises controllable current source 61, a resistor R0, a multiplexer 71, a multiplexer 72, and a multiplexer 73. Resistor R0 has a first terminal coupled to controllable current source 61 to receive current M*Iout, and a second terminal configured to receive voltage sense signal Vosen, and resistor R0 has a plurality of taps Ta(1), Ta(2), . . . Ta(n), each of the plurality of taps has a corresponding voltage. Multiplexer 71 is coupled to the plurality of taps, and is configured to choose one of the plurality of taps to provide feedback signal Vfb1 under control of slope LL1, e.g., to satisfy equation (4). Multiplexer 72 is coupled to the plurality of taps, and is configured to choose one of the plurality of taps to provide feedback signal Vfb2 under control of slope LL2, e.g., to satisfy equation (5). Multiplexer 73 is coupled to the plurality of taps, and is configured to choose one of the plurality of taps to provide feedback signal Vfb3 under control of slope LL3, e.g., to satisfy equation (6).

Figure 8:
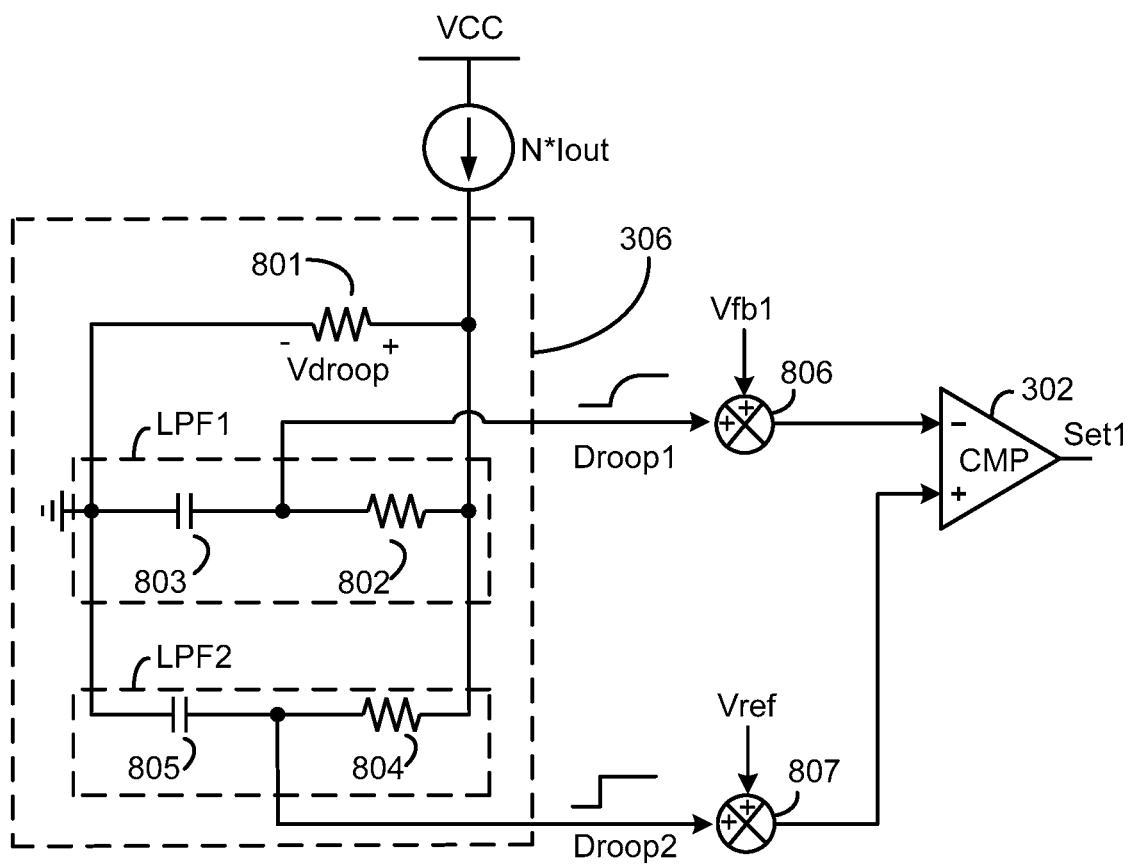
FIG. 8 schematically illustrates a compensator 306 in accordance with an embodiment of the present invention.

FIG. 8 schematically illustrates a compensator 306 in accordance with an embodiment of the present invention. In FIG. 8, compensator 306 provides a compensation signal Droop1 and a compensation signal Droop2 to compensate feedback signal Vfb1. Compensator 306 comprises a droop resistor 801, a filter LPF1 comprising a resistor 802 and a capacitor 803, and a filter LPF2 comprising a resistor 804 and a capacitor 805. A current proportional to output current Iout flows through droop resistor 801 and provides droop voltage Vdroop across droop resistor 801. Filter LPF1 provides compensation signal Droop1 via filtering voltage Vdroop by resistor 802 and capacitor 803. Serially coupled resistor 802 and capacitor 803 are coupled in parallel with droop resistor 801. Compensator 306 provides compensation signal Droop1 at a common node of resistor 802 and capacitor 803. Filter LPF2 provides compensation signal Droop2 via filtering droop voltage Vdroop by resistor 804 and capacitor 805. Serially coupled resistor 804 and capacitor 805 are coupled in parallel with droop resistor 801. Compensator 306 provides compensation signal Droop2 at a common node of resistor 804 and capacitor 805. In one embodiment, compensation signal Droop1 is added to feedback signal Vfb1 through an operational circuit 806, and compensation signal Droop2 is added to reference voltage Vref through an operational circuit 807, wherein a slew rate of compensation signal Droop2 is larger than a slew rate of compensation signal Droop1, and amplitudes of compensation signals Droop1 and Droop2 equal with each other. In another embodiment, compensation signal Droop2 may be subtracted from feedback signal Vfb1.

Figure 9A:
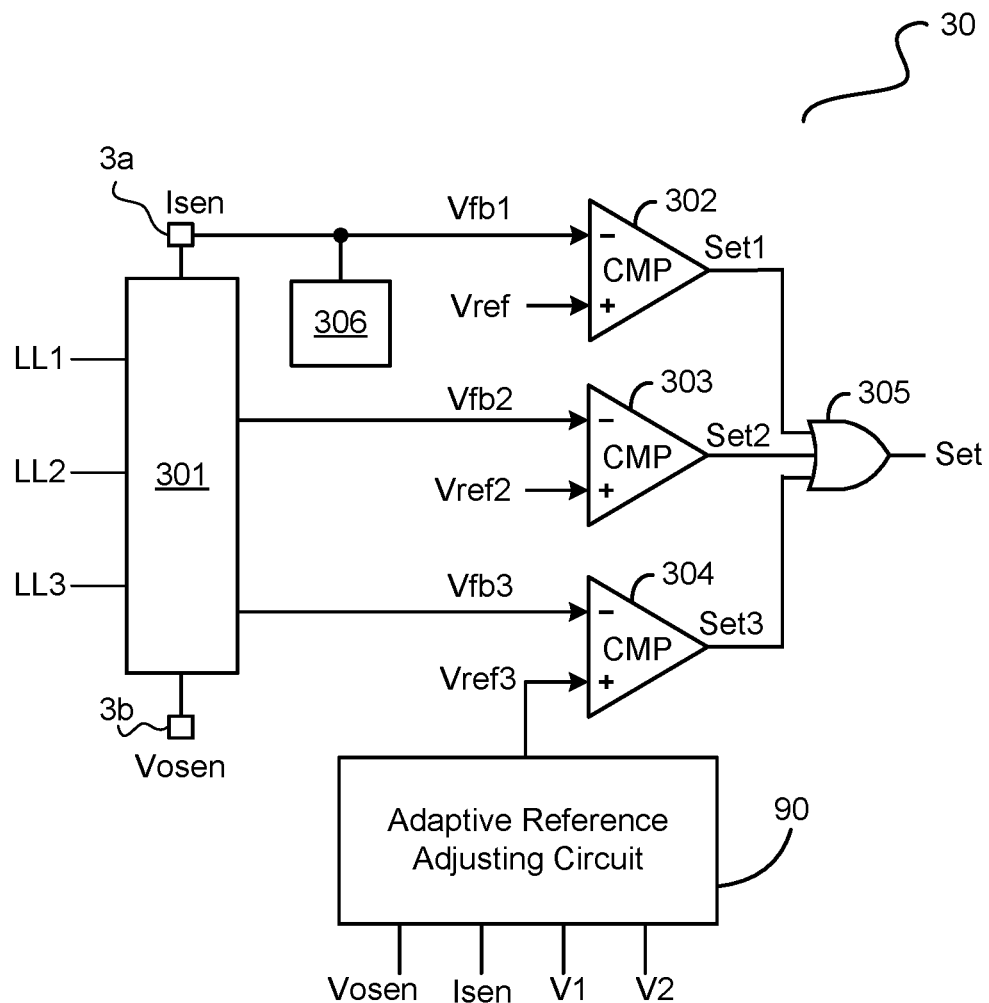
FIG. 9A schematically illustrates nonlinear AVP control circuit 30 with a reference adjusting circuit 90 in accordance with an embodiment of the present invention.

FIG. 9A schematically illustrates nonlinear AVP control circuit 30 with a reference adjusting circuit 90 in accordance with an embodiment of the present invention. Reference adjusting circuit 90 is configured provide adjustable reference voltage Vref3 in response to output voltage Vout and output current Iout. In one embodiment shown in FIG. 9A, reference adjusting circuit 90 receives voltage sense signal Vosen, current sense signal Isen, voltage level V1 and voltage level V2, and provides reference voltage Vref3 accordingly. In one embodiment, reference voltage Vref3 decreases from voltage level V1 to voltage level V2 with a certain slope when voltage sense signal Vosen indicates that output voltage Vout decreases less than a threshold Vth during load step up period, and reference voltage Vref3 increases back to voltage level V1 when current sense signal Isen indicates that load step down happens.

Figure 9B:
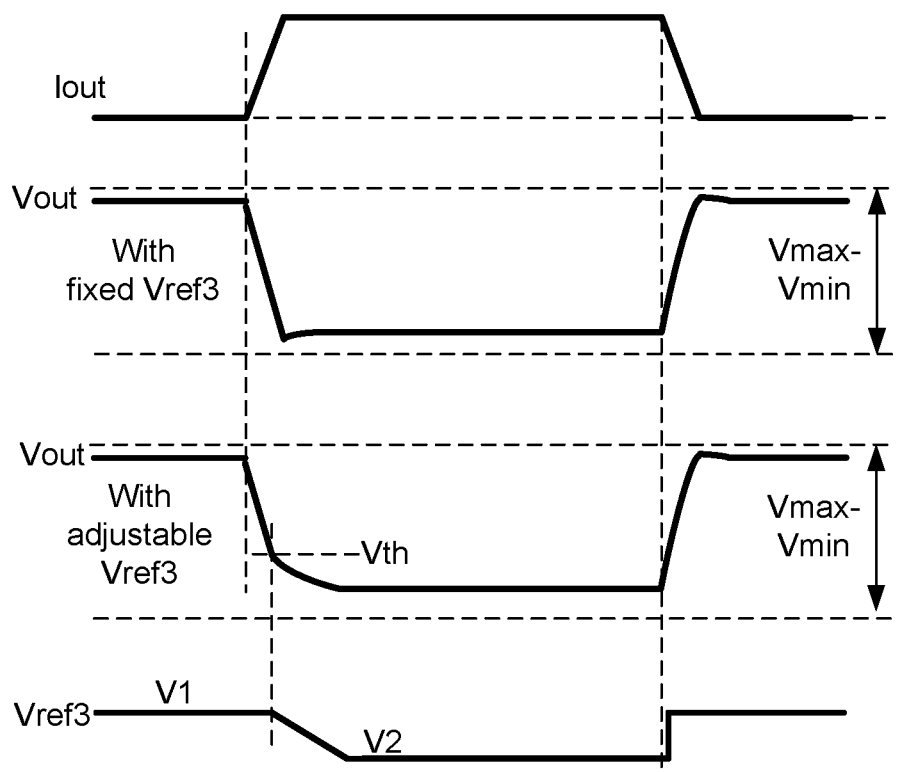
FIG. 9B illustrates waveforms of voltage regulator 300 with fixed reference voltage Vref3 and with adjustable reference voltage Vref3 in accordance with an embodiment of present invention.

FIG. 9B illustrates waveforms of voltage regulator 300 with fixed reference voltage Vref3 and with adjustable reference voltage Vref3 in accordance with an embodiment of present invention. As shown in FIG. 9B, output voltage Vout decreasing to fixed reference voltage Vref3 has undershoot during load step up period. Reference adjusting circuit 90 shown in FIG. 9B is employed to further reduce or eliminate undershoot of output voltage Vout during load step up period. Adjustable reference voltage Vref3 decreases from voltage level V1 to voltage level V2 when output voltage Vout decreases less than threshold Vth during load step up period. Thus output voltage Vout could follow reference voltage Vref3 to decrease without any undershoot. Reference voltage Vref3 increases back to voltage level V1 during load step down period.

Figure 10:
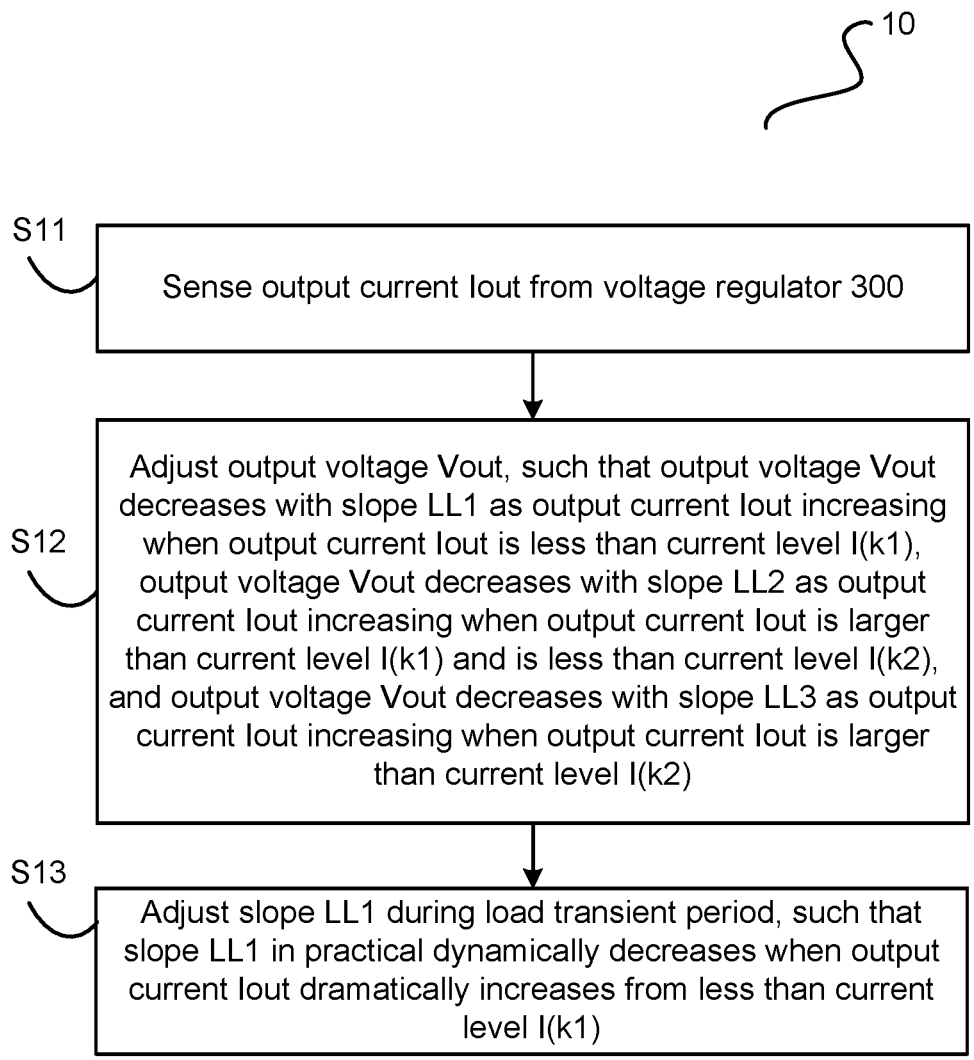
FIG. 10 illustrates a flow chart 10 of voltage regulator 300 in accordance with an embodiment of the present invention.

FIG. 10 illustrates a flow chart 10 of voltage regulator 300 in accordance with an embodiment of the present invention. Flow chart 10 comprises steps S11-S13.

At step S11, sense output current Iout from voltage regulator 300.

At step S12, adjust output voltage Vout, such that output voltage Vout decreases with slope LL1 as output current Iout increasing when output current Iout is less than current level I(k1), output voltage Vout decreases with slope LL2 as output current Iout increasing when output current Iout is larger than current level I(k1) and is less than current level I(k2), and output voltage Vout decreases with slope LL3 as output current Iout increasing when output current Iout is larger than current level I(k2).

At step S13, dynamically adjust slope LL1 during load transient period, such that slope LL1 in practical decreases when output current Iout dramatically increases from less than current level I(k1).

Figure 11:
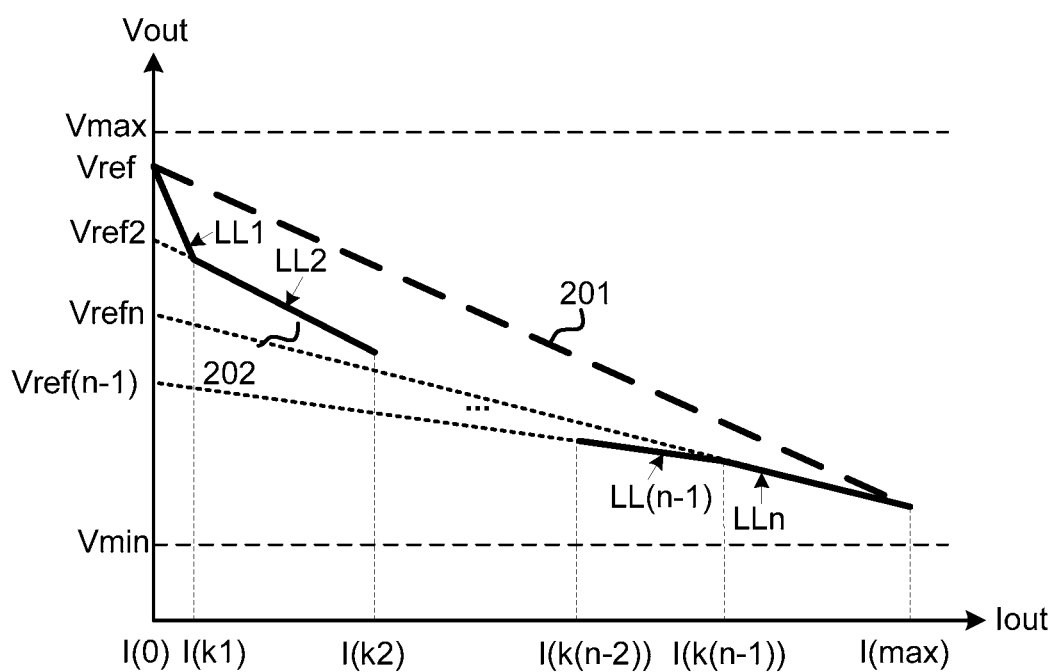
FIG. 11 illustrates principle of nonlinear AVP control in accordance with embodiments of the present invention FIG. 12 schematically illustrates a voltage regulator 400 in accordance with an embodiment of the present invention.

Curve 202 in FIG. 11 shows a multi-stage nonlinear AVP control scheme in accordance with an embodiment of the present invention. The difference between curve 202 in FIG. 11 and curve 202 in FIG. 2A-FIG. 2D is that there are no limits of slope LL1-LLn, i.e. slope LLn can be larger or smaller than LL(n-1), and Vrefn can be larger or smaller than Vref(n-1), wherein n is a natural number larger or equal than 2. In one embodiment, the slope LLn can be zero.

In one embodiment illustrated in FIG. 11, when output current Iout is larger than a current level I(k(n-2)) and is less than a current level I(k(n-1)), output voltage Vout decreases with a slope LL(n-1) as output current Iout increases, and the relationship between output voltage Vout and output current Iout can be expressed as:

$$Vout = Vref(n-1) - LL(n-1) * Iout \tag{10}$$

In one embodiment illustrated in FIG. 11, when output current Iout is larger than a current level I(k(n-1)) and is less than maximum current level I(max), output voltage Vout decreases with a slope LLn as output current Iout increases, and the relationship between output voltage Vout and output current Iout can be expressed as:

$$Vout = Vrefn - LLn * Iout \tag{11}$$

Figure 12:
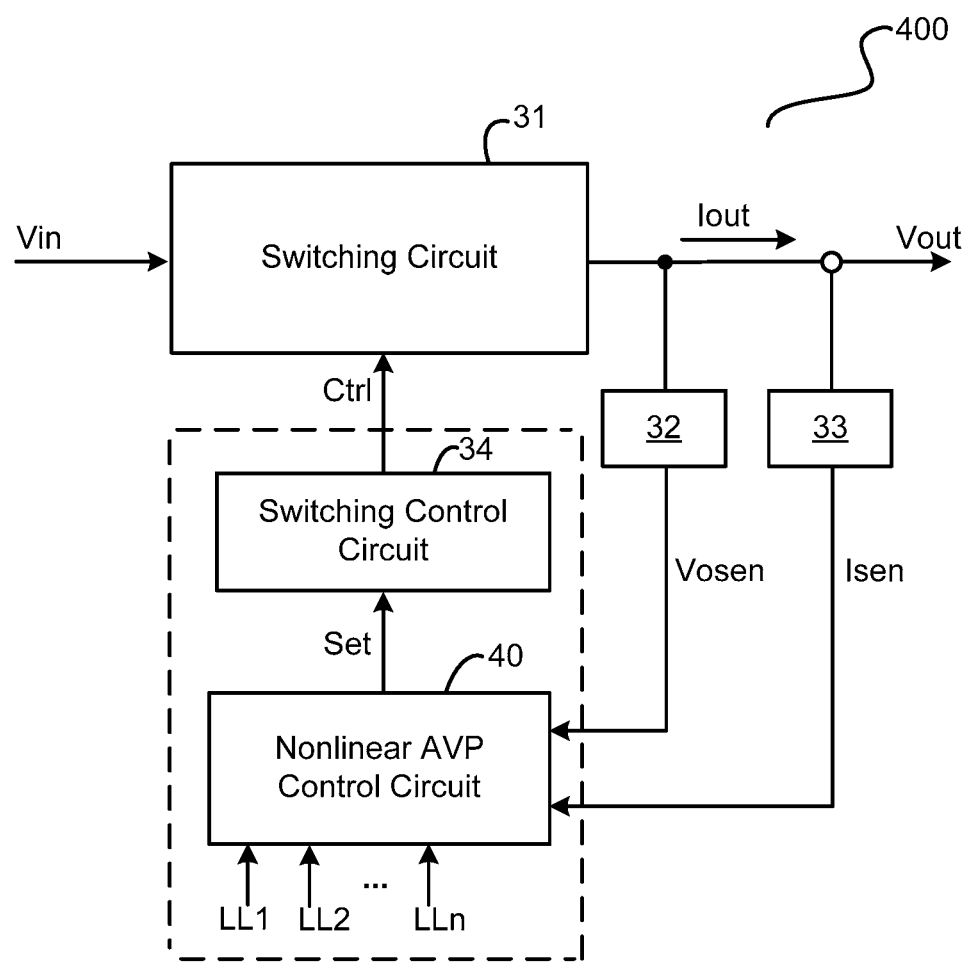

FIG. 12 schematically illustrates a voltage regulator 400 in accordance with an embodiment of the present invention. The difference with the voltage regulator 300 shown in FIG. 3 is that the nonlinear AVP control circuit 40 is configured to receive voltage sense signal Vosen, current sense signal Isen, slopes LL1, ..., LLn, and is configured to provide the set signal Set based on the output voltage Vout, output current Iout and slope LL1, ..., LLn, wherein n is a natural number larger than or equal to 2. The switching control circuit 34 is further configured to provide a switching control signal Ctrl to switching circuit 31 to adjust output voltage Vout, such that output voltage Vout decreases with slope LL(n-1) as output current Iout increases when output current Iout is less than current level I(k(n-1)), and output voltage Vout decreases with slope LLn as output current Iout increases when output current Iout is larger than current level I(k(n-1)) and is less than the maximum current level I(max), wherein n is a natural number larger than or equal to 2.

Figure 13:
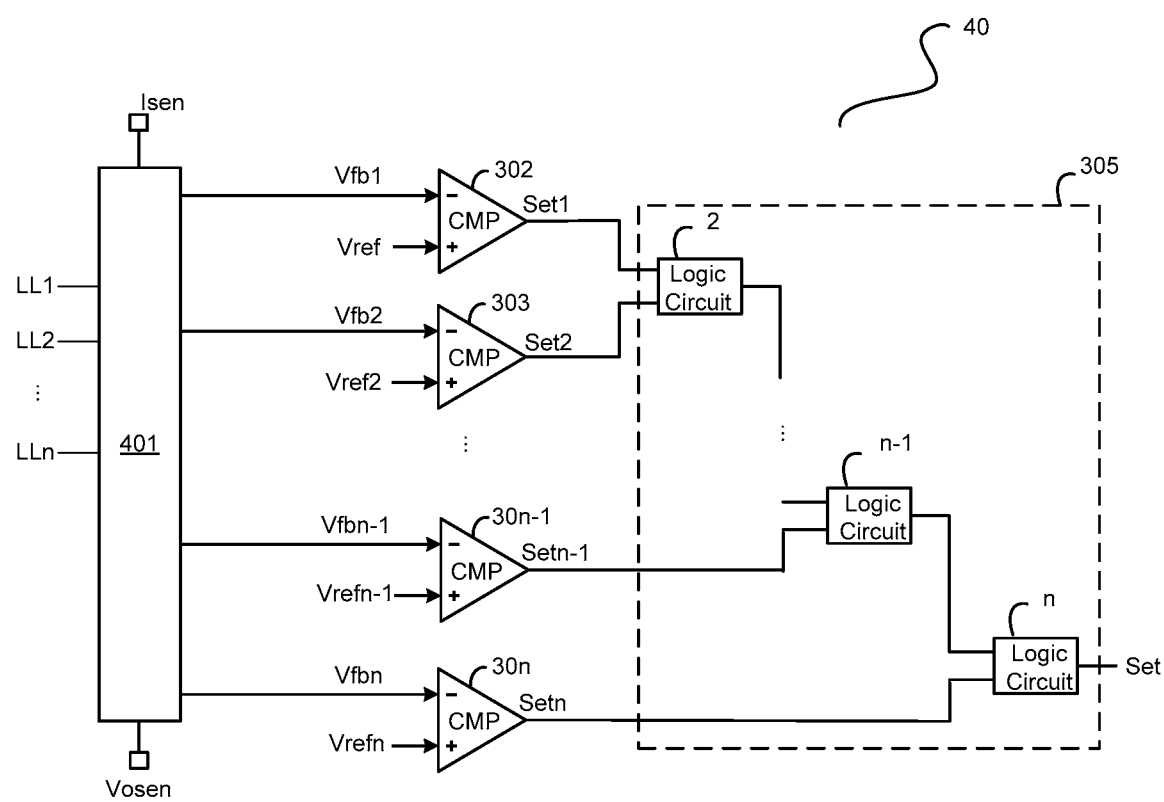
FIG. 13 schematically illustrates a nonlinear AVP control circuit 40 in accordance with an embodiment of the present invention.

FIG. 13 schematically illustrates a nonlinear AVP control circuit 40 in accordance with an embodiment of the present invention. The difference with the nonlinear AVP control circuit 30 shown in FIG. 4A is that the logic circuit 305 is configured to receive comparison signals Set1, ..., Setn and provide set signal Set based on comparison signals Set1, Set2, ..., Set(n-1) and Setn. In one embodiment, logic circuit 305 comprises logic circuit 2, ..., logic circuit (n-1) and logic circuit n. The voltage generator 401 is configured to receive current sense signal Isen, voltage sense signal Vosen and slopes LL1, ..., LLn, and configured to provide feedback signals Vfb1, Vfb2, ..., Vfb(n-1) and Vfbn, wherein n is a natural number larger than or equal to 2.

In one embodiment, if LL(n-1) is larger than LLn, logic circuit n is an OR gate, the switching circuit is configured to be turned on if any of the comparison signal setn or an output signal of logic circuit (n-1) is at logic high. If LL(n-2) is larger than LL(n-1), logic circuit (n-1) is an OR gate, and if LL1 is larger than LL2, logic circuit 2 is an OR gate.

In one embodiment, if LLn is larger than LL(n-1), logic circuit n is an AND gate, the switching circuit is configured to be turned on only when both the comparison signal setn and the output signal of the logic circuit (n-1) are at logic high. If LL(n-1) is larger than LL(n-2), logic circuit (n-1) is an AND gate, and if LL2 is larger than LL1, logic circuit 2 is an AND gate.

Voltage generator 401 is configured to provide feedback signal Vfb(n-1) in response to output voltage Vout, output current Iout and slope LL(n-1). In one embodiment, feedback signal Vfb(n-1) can be expressed as:

$$Vfb(n-1) = Vosen + Iout * LL(n-1) \tag{12}$$

Voltage generator 401 is configured to provide feedback signal Vfbn in response to output voltage Vout, output current Iout and slope LLn. In one embodiment, feedback signal Vfbn can be expressed as:

$$Vfbn = Vosen + Iout * LLn \tag{13}$$

In one embodiment illustrated in FIG. 13, comparator 302, comparator 303, ..., comparator 30(n-1) and comparator 30n form a compare circuit.

Comparator 30(n-1) has an inverting terminal coupled to voltage generator 401 to receive feedback signal Vfb(n-1), a non-inverting terminal configured to receive reference voltage Vref(n-1) which is used to set output voltage Vout, and an output terminal configured to provide a comparison signal Set(n-1) by comparing the feedback signal Vfb(n-1) with the reference voltage Vref(n-1). In one embodiment, feedback signal Vfb(n−1) and/or reference voltage Vref(n−1) may comprise other signals such as a slope compensation signal.

Comparator $30n$ has an inverting terminal coupled to voltage generator 401 to receive feedback signal Vfbn, a non-inverting terminal configured to receive a reference voltage Vrefn, and an output terminal configured to provide a comparison signal Setn by comparing the feedback signal Vfbn with the reference voltage Vrefn. In one embodiment, feedback signal Vfb2 and/or reference voltage Vrefn may comprise other signals such as a slope compensation signal.

Figure 14:
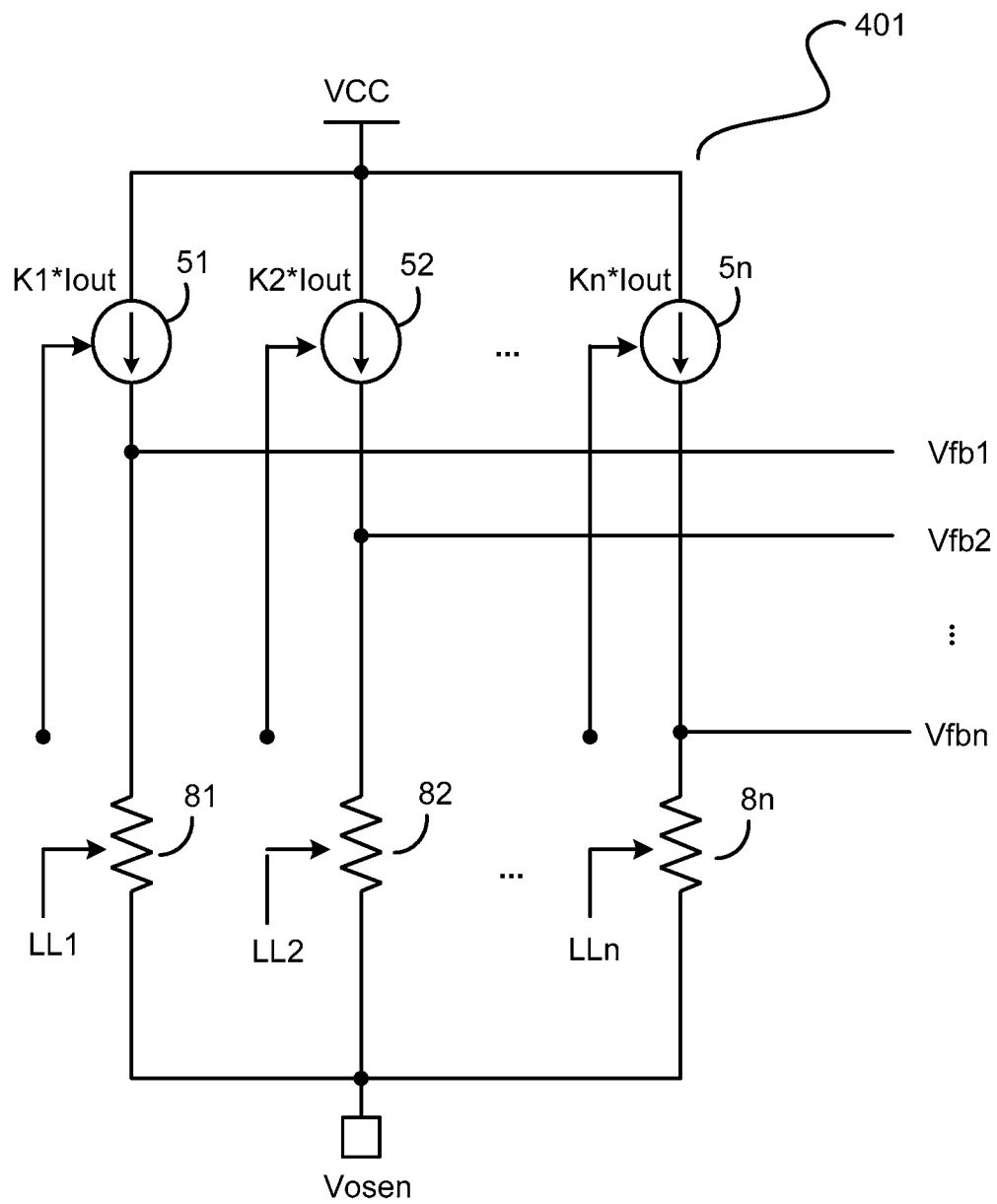
FIG. 14 schematically illustrates a voltage generator 401 in accordance with an embodiment of the present invention.

FIG. 14 schematically illustrates a voltage generator 401 in accordance with an embodiment of the present invention. The difference between the voltage generator 301 shown in FIG. 5 is that the voltage generator 401 comprises controllable current sources 51, 52, ..., $5n$, wherein n is a natural number larger than or equal to 2.

Controllable current source 51 is configured to provide a current K1*Iout which is proportional to output current Iout, current K1*Iout flows through resistor 81 to provide feedback signal Vfb1. Resistor 81 has a first terminal coupled to controllable current source 51 and a second terminal coupled to receive voltage sense signal Vosen. Coefficient K1 and a resistance R81 of resistor 81 are controlled based on slope LL1 to satisfy equation (4), that is:

$$K1*R81 = LL1 \quad (14)$$

Controllable current source 52 is configured to provide a current K2*Iout which is proportional to output current Iout, current K2*Iout flows through resistor 82 to provide feedback signal Vfb2. Resistor 82 has a first terminal coupled to controllable current source 52 and a second terminal coupled to receive voltage sense signal Vosen. Coefficient K2 and a resistance R82 of resistor 82 are controlled based on slope LL2 to satisfy equation (5), that is:

$$K2*R82 = LL2 \quad (15)$$

Controllable current source $5n$ is configured to provide a current Kn*Iout which is proportional to output current Iout, current Kn*Iout flows through resistor $8n$ to provide feedback signal Vfbn. Resistor $8n$ has a first terminal coupled to controllable current source $5n$ and a second terminal coupled to receive voltage sense signal Vosen. Coefficient Kn and a resistance $R8n$ of resistor $8n$ are controlled based on slope LLn to satisfy equation (13), that is:

$$Kn*R8n = LLn \quad (16)$$

In one embodiment, current sources 51, 52, ..., and $5n$ are adjustable, that is coefficients K1, K2 ..., and Kn are adjustable to satisfy different requirements of slopes LL1, LL2, and LLn, and resistances R81, R82, ..., and $R8n$ are predetermined. In one embodiment, resistances R81, R82, ..., and $R8n$ are adjustable to satisfy different requirements of slopes LL1, LL2 ..., and LLn, and coefficients K1, K2 ..., and Kn are predetermined. In one embodiment, current sources 51, 52 ..., and $5n$ are adjustable, that is coefficients K1, K2 ..., and Kn are adjustable, and resistances R61, R82, ..., and $R8n$ are adjustable, to satisfy different requirements of slopes LL1, LL2 ..., and LLn. Wherein n is a natural number larger than or equal to 2.

Figure 15A:
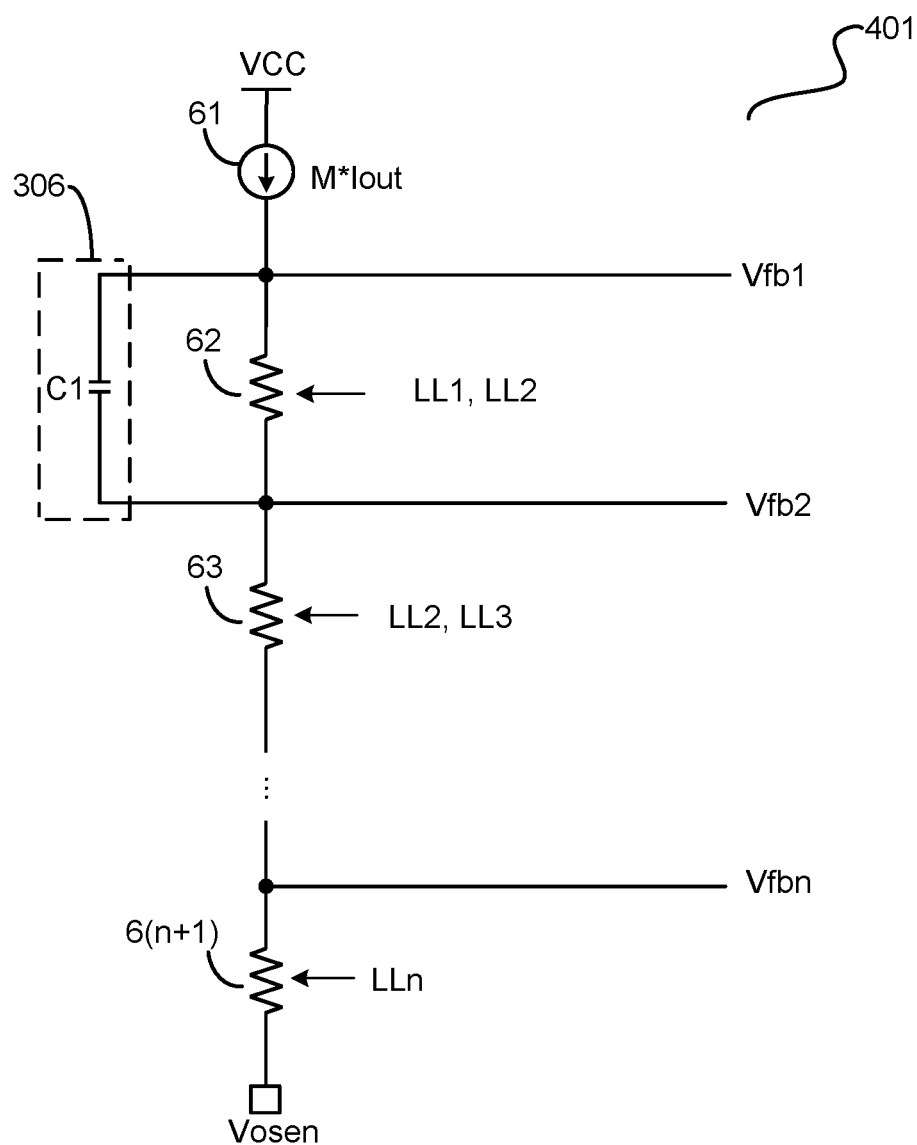
FIG. 15A-15D schematically illustrates voltage generator 401 in accordance with other embodiments of the present invention.

FIG. 15A schematically illustrates a voltage generator 401 in accordance with another embodiment of the present invention. In the embodiment shown in FIG. 15, LL1> LL2> ... >LLn, the voltage generator 301 comprises a controllable current source 61, resistors 62, 63, ..., $6n$ and $6(n+1)$, which are coupled in series, wherein n is a natural number larger than or equal to 2. Controllable current source 61 is configured to provide a current M*Iout which is proportional to output current Iout. Resistor 62 has a first terminal coupled to controllable current source 61 to receive current M*Iout and a second terminal, wherein feedback signal Vfb1 is provided at the first terminal of resistor 62, and a resistance R62 of resistor 62 is controlled in response to slope LL1 and slope LL2, e.g., R62=(LL1−LL2)/M. Resistor 63 has a first terminal coupled to the second terminal of resistor 62 and a second terminal, wherein feedback signal Vfb2 is provided at the first terminal of resistor 63, and a resistance R63 of resistor 63 is controlled in response to slope LL2 and slope LL3, e.g., R63=(LL2−LL3)/M. Feedback signal Vfbn is provided at the first terminal of resistor $6(n+1)$, and a resistance $R6(n+1)$ of resistor $6(n+1)$ is controlled in response to slope LLn, e.g., $R6(n+1)=LLn/M$.

Figure 15B:
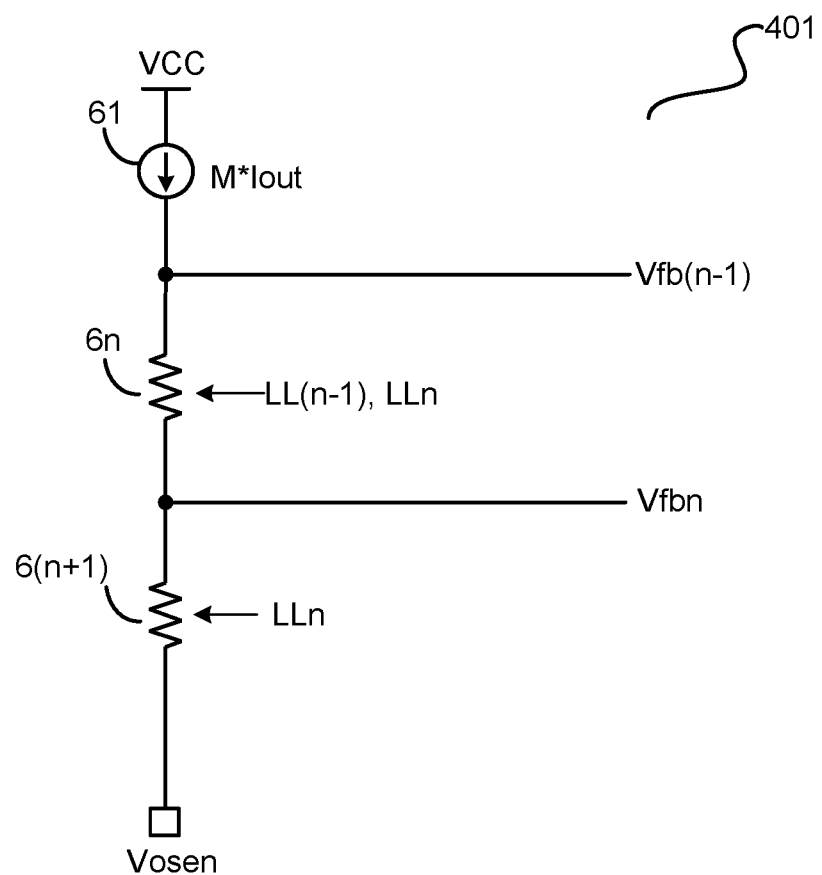

FIG. 15B schematically illustrates a voltage generator 401 in accordance with another embodiment of the present invention. In the embodiment shown in FIG. 15B, slope LLn is smaller than LL(n−1). Feedback signal Vfbn−1 is provided at the first terminal of resistor $6n$, and a resistance $R6n$ of resistor $6n$ is controlled in response to slope LL(n−1) and slope LLn, e.g., $R6n=[LL(n−1)−LLn]/M$. Feedback signal Vfbn is provided at the first terminal of resistor $6(n+1)$, and a resistance $R6(n+1)$ of resistor $6(n+1)$ is controlled in response to slope LLn, e.g., $R6(n+1)=LLn/M$.

Figure 15C:
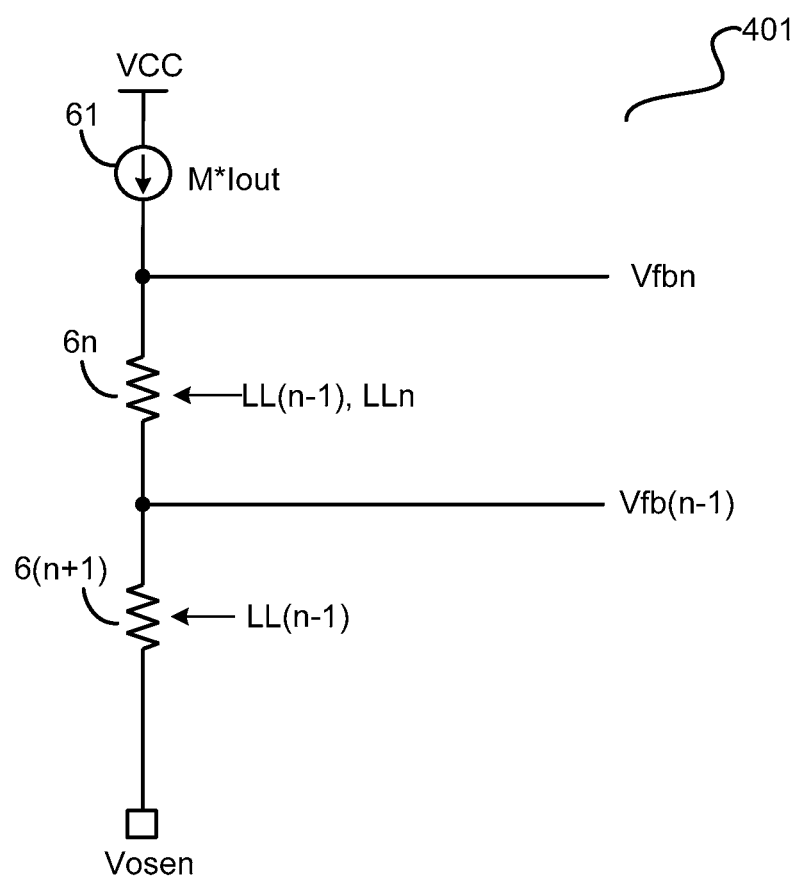

FIG. 15C schematically illustrates a voltage generator 401 in accordance with another embodiment of the present invention. In the embodiment shown in FIG. 15C, slope LLn is larger than LL(n−1). Feedback signal Vfbn is provided at the first terminal of resistor $6n$, and a resistance $R6n$ of resistor $6n$ is controlled in response to slope LL(n−1) and slope LLn, e.g., $R6n=[LLn−LL(n−1)]/M$. Feedback signal Vfb(n−1) is provided at the first terminal of resistor $6(n+1)$, and a resistance $R6(n+1)$ of resistor $6(n+1)$ is controlled in response to slope LL(n−1), e.g., $R6(n+1)=LL(n−1)/M$.

Figure 15D:
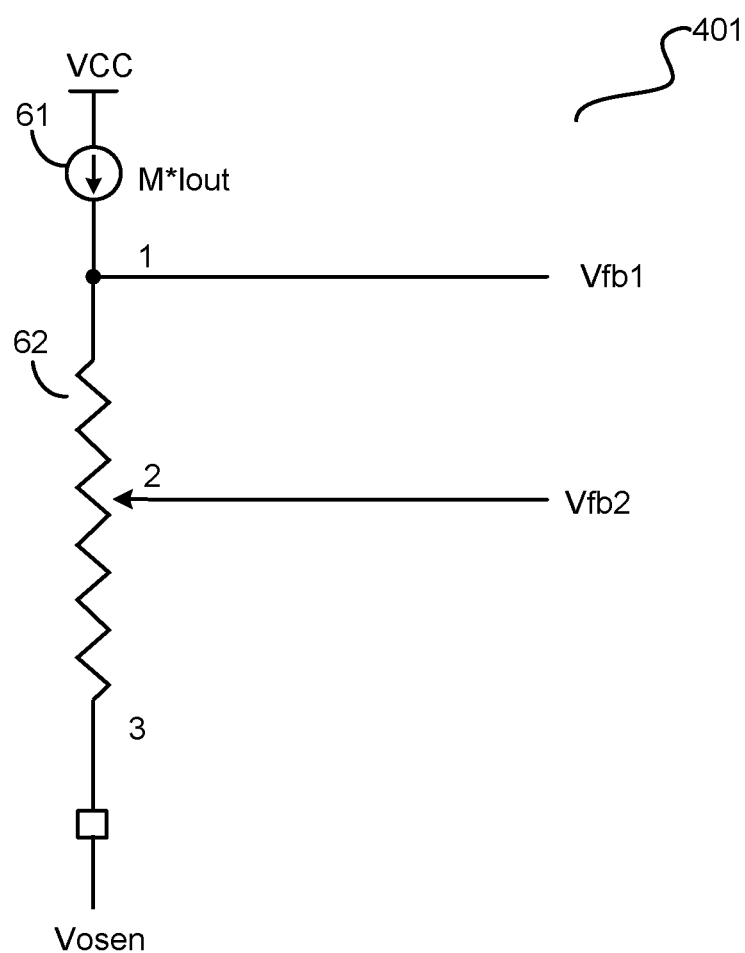

FIG. 15D schematically illustrates a voltage generator 401 in accordance with another embodiment of the present invention. The voltage generator comprises a controllable current source 61 and a resistor 62 which are coupled in series. Controllable current source 61 is configured to provide a current M*Iout which is proportional to output current Iout. Resistor 62 has a first terminal 1, a second terminal 2 and a third terminal 3, wherein the first terminal 1 is coupled to the controllable current source 61 to receive current M*Iout, the third terminal 3 is configured to receive the voltage sense signal Vosen. Wherein if slope LL1 is larger than slope LL2, the first terminal 1 is configured to provide the first feedback signal Vfb1, the second terminal 2 is configured to provide the second feedback signal Vfb2, if slope LL1 is smaller slope LL2, the first terminal 1 is configured to provide the second feedback signal Vfb2, the second terminal 2 is configured to provide the first feedback signal, wherein the position of the terminal 2 is controlled in response to the slope LL1 and the slope LL2, and a resistance R62 of resistor 62 is controlled in response to slope LL1 and slope LL2, e.g., R62=LL1/M or R62=LL2/M. In one embodiment, the resistor 62 can be a slide rheostat.

Figure 16:
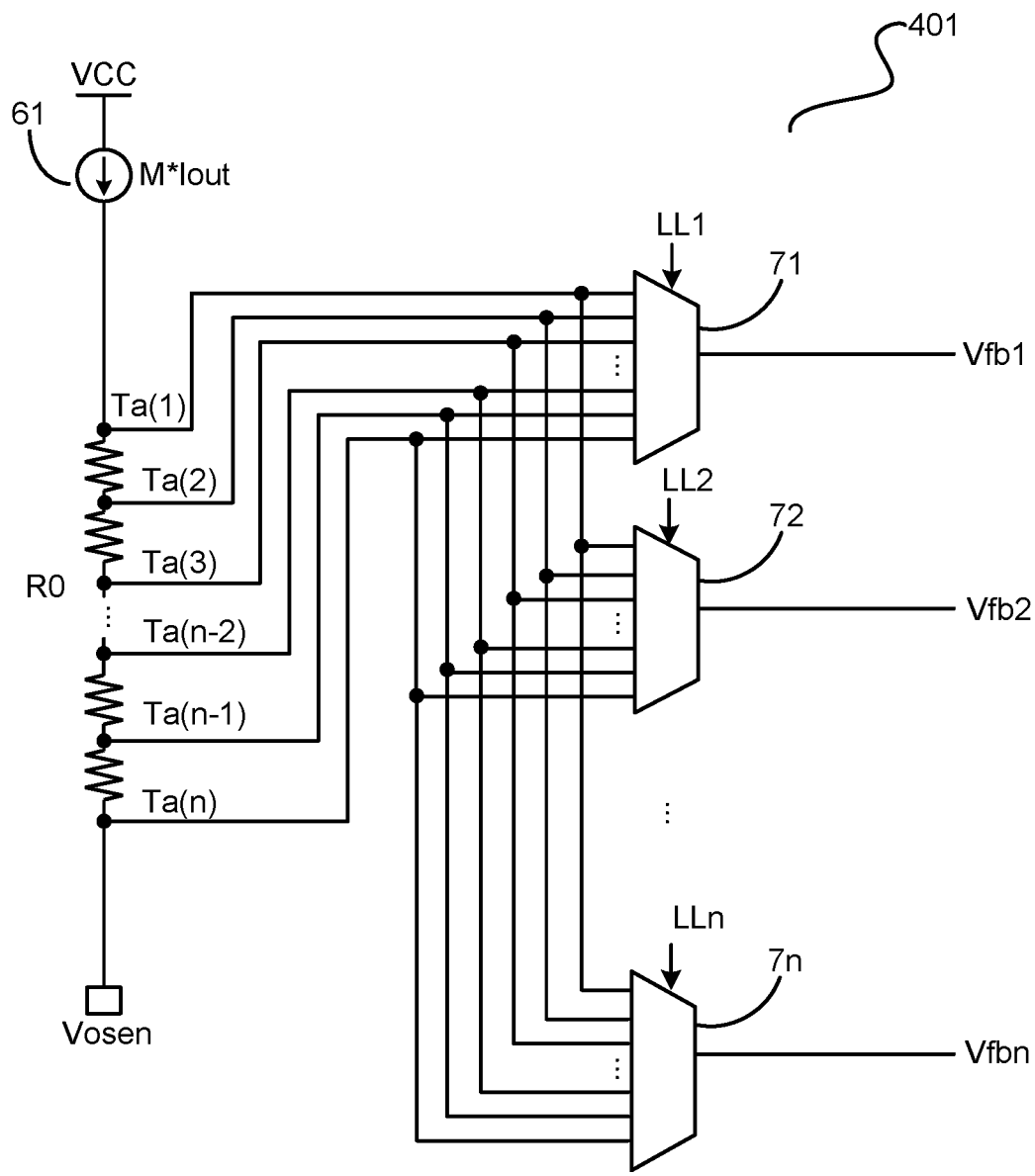
FIG. 16 schematically illustrates a voltage generator 401 in accordance with another embodiment of the present invention.

FIG. 16 schematically illustrates a voltage generator 401 in accordance with another embodiment of the present invention. The difference between the voltage generator 301 shown in FIG. 7 is that the voltage generator 401 comprises a multiplexer 71, a multiplexer 72, ..., and a multiplexer $7n$, wherein n is a natural number larger than or equal to 2. Multiplexer $7n$ is coupled to the plurality of taps, and is configured to choose one of the plurality of taps to provide feedback signal Vfbn under control of slope LLn, e.g., to satisfy equation (13).

Figure 17:
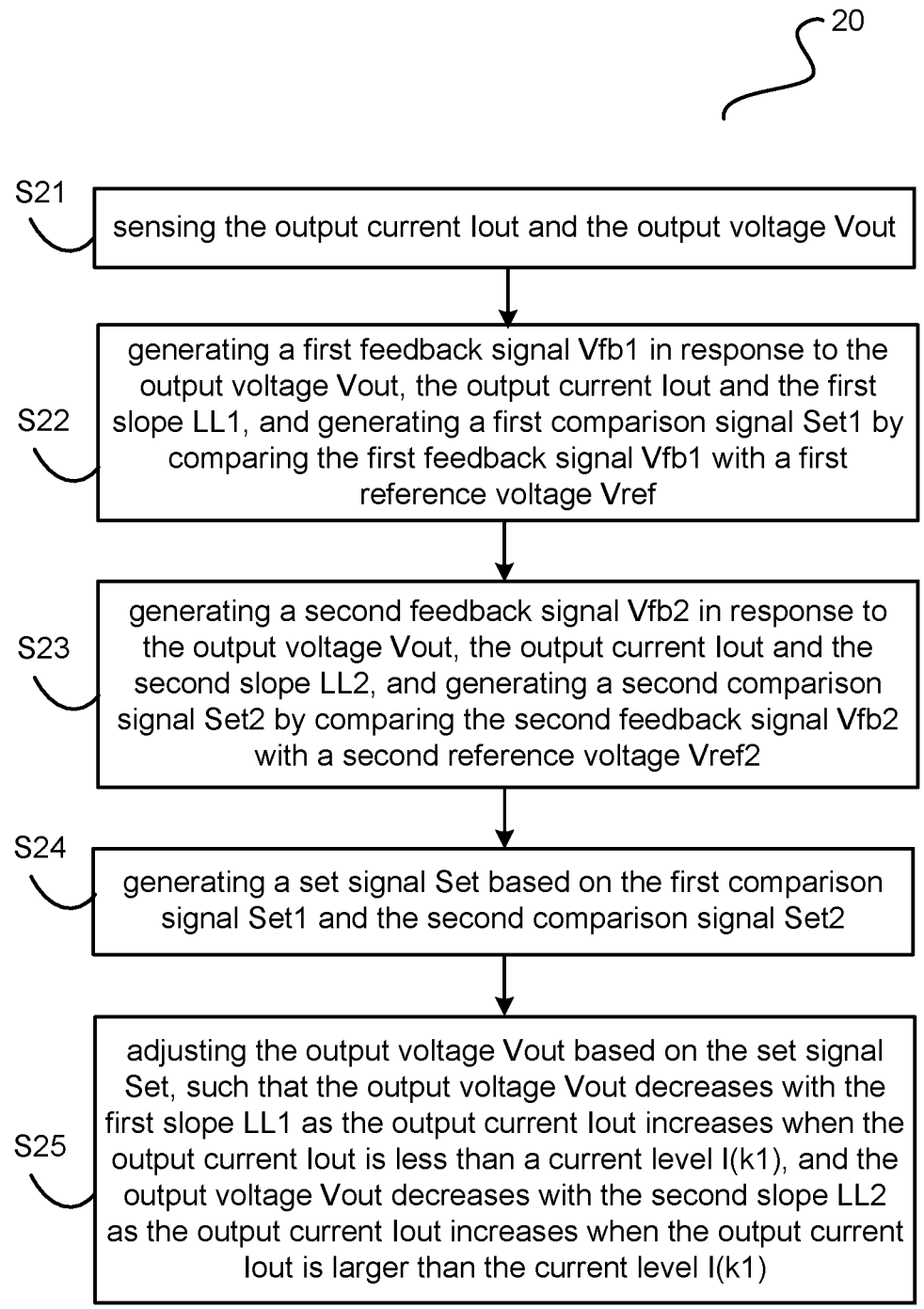
FIG. 17 illustrates a flow chart 20 of voltage regulator 400 in accordance with an embodiment of the present invention.

FIG. 17 illustrates a flow chart 20 of voltage regulator 400 in accordance with an embodiment of the present invention. Flow chart 20 comprises steps S21-S25.

At step S21, sensing the output current Iout and the output voltage Vout;

At step S22, generating a first feedback signal Vfb1 in response to the output voltage Vout, the output current Iout and the first slope LL1, and generating a first comparison signal Set1 by comparing the first feedback signal Vfb1 with a first reference voltage Vref.

At step S23, generating a second feedback signal Vfb2 in response to the output voltage Vout, the output current Iout and the second slope LL2, and generating a second comparison signal Set2 by comparing the second feedback signal Vfb2 with a second reference voltage Vref2.

At step S24, generating a set signal Set based on the first comparison signal Set1 and the second comparison signal Set2.

At step S25, adjusting the output voltage Vout based on the set signal Set, such that the output voltage Vout decreases with the first slope LL1 as the output current Iout increases when the output current Iout is less than a current level I(k1), and the output voltage Vout decreases with the second slope LL2 as the output current Iout increases when the output current Iout is larger than the current level I(k1).

In one embodiment, the first slope LL1 is zero.

In one embodiment, the second slope LL2 is zero.

In on embodiment, generating the set signal Set based on the first comparison signal Set1 and the second comparison signal Set2 comprises controlling the set signal Set to be logic high when any of the first comparison signal Set1 and the second comparison signal Set2 is at logic high if the first slope Ll1 is larger than the second slope LL2.

In on embodiment, generating the set signal Set based on the first comparison signal Set1 and the second comparison signal Set2 comprises controlling the set signal Set to be logic high only when both of the first comparison signal Set1 and the second comparison signal Set2 are at logic high if the second slope LL1 is larger than the first slope LL2.

In one embodiment, the number of slopes is not limited to 2, and the number of current levels corresponding to slopes is also not limited to 1.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control circuit for a voltage regulator, the voltage regulator is configured to receive an input voltage and provide an output voltage and an output current, the control circuit comprising:
    a voltage generator, configured to receive a first signal with a first slope, a second signal with a second slope, the input voltage and the output voltage, and is further configured to provide a first feedback signal in response to the output voltage, the output current and the first signal with the first slope, and configured to provide a second feedback signal in response to the output voltage, the output current and the second signal with the second slope;
    a compare circuit, configured to provide a first comparison signal by comparing the first feedback signal with a first reference signal, and configured to provide a second comparison signal by comparing the second feedback signal with a second reference signal; and
    a logic circuit, configured to generate a set signal based on the first comparison signal and the second comparison signal; wherein
    the control circuit is configured to adjust the output voltage based on the set signal, such that the output voltage decreases with the first slope as the output current increases when the output current is less than a predetermined current, and the output voltage decreases with the second slope as the output current increases when the output current is larger than the predetermined current.

2. The control circuit of claim 1, wherein if the first slope is larger than the second slope, the logic circuit is configured to generate the set signal being logic high when any of the first comparison signal and the second comparison signal is at logic high, wherein values of the first slope and the second slope are predetermined.

3. The control circuit of claim 1, wherein if the second slope is configured to be larger than the first slope, the logic circuit is configured to generate the set signal being logic high only when both of the first comparison signal and the second comparison signal are at logic high, wherein values of the first slope and the second slope are predetermined.

4. The control circuit of claim 1, wherein the first slope or the second slope is equal to zero.

5. The control circuit of claim 1, wherein the voltage generator comprises:
    a first controllable current source, configured to provide a first current equaling to a first coefficient times the output current;
    a first resistor, coupled in series with the first controllable current source to provide the first feedback signal;
    a second controllable current source, configured to provide a second current equaling to a second coefficient times the output current; and
    a second resistor, coupled in series with the second controllable current source to provide the second feedback signal.

6. The control circuit of claim 1, wherein the voltage generator comprises:
    a controllable current source, configured to provide a current proportional to the output current; and
    a resistor, coupled in series with the controllable current source, having a first terminal, a second terminal and a third terminal, wherein the first terminal is configured to provide the first feedback signal, the second terminal is configured to provide the second feedback signal, the third terminal is configured to receive a feedback signal of the output voltage, and a resistance of the resistor is controlled in response to the first signal with the first slope and the second signal with the second slope.

7. The control circuit of claim 1, wherein the voltage generator comprises:
    a controllable current source, configured to provide a current proportional to the output current;
    a first resistor, having a first terminal and a second terminal, wherein the first terminal is coupled to the controllable current source and configured to provide the first feedback signal, and a resistance of the first resistor is controlled in response to the first signal with the first slope and the second signal with the second slope; and a second resistor, having a first terminal and a second terminal, wherein the first terminal is coupled to the second terminal of the first resistor and configured to provide the second feedback signal, and a resistance of the second resistor is controlled in response to the second signal with the second slope.

8. The control circuit of claim 1, wherein the voltage generator comprises:

a controllable current source, configured to provide a current proportional to the output current;

a first resistor, having a first terminal and a second terminal, wherein the first terminal is coupled to the controllable current source and configured to provide the second feedback signal, and a resistance of the first resistor is controlled in response to the first signal with the first slope and the second signal with the second slope; and a second resistor, having a first terminal and a second terminal, wherein the first terminal is coupled to the second terminal of the first resistor and configured to provide the first feedback signal, and a resistance of the second resistor is controlled in response to the first signal with the first slope.

9. The control circuit of claim 1, wherein the voltage generator comprises:

a controllable current source, configured to provide a current proportional to the output current;

a resistor, having a first terminal coupled to the controllable current source and a second terminal coupled to a voltage sense signal representative of the output voltage, the resistor comprises a plurality of taps;

a first multiplexer, coupled to the plurality of taps, the first multiplexer is configured to choose one of the plurality of taps to provide the first feedback signal based on the first slope; and a second multiplexer, coupled to the plurality of taps, the second multiplex is configured to choose one of the plurality of taps to provide the second feedback signal based on the second slope.

10. A voltage regulator, comprising:

a switching circuit, configured to receive an input voltage and provide an output voltage and an output current;

a voltage generator, configured to provide a first feedback signal in response to the output voltage, the output current and a first signal with a first slope, and configured to provide a second feedback signal in response to the output voltage, the output current and a second signal with a second slope;

a first comparator, configured to provide a first comparison signal by comparing the first feedback signal with a first reference voltage;

a second comparator, configured to provide a second comparison signal by comparing the second feedback signal with a second reference voltage; and a switching control circuit, configured to provide a switching control signal to turn on the switching circuit based on a set signal to adjust the output voltage, such that the output voltage decreases with the first slope as the output current increases when the output current is less than a predetermined current, and the output voltage decreases with the second slope as the output current increases when the output current is larger than the predetermined current; wherein the set signal is configured to be generated in response to the first comparison signal and the second comparison signal.

11. The voltage regulator of claim 10, wherein the voltage generator comprises:

a first controllable current source, configured to provide a first current equaling to a first coefficient times the output current;

a first resistor, coupled in series with the first controllable current source to provide the first feedback signal;

a second controllable current source, configured to provide a second current equaling to a second coefficient times the output current; and a second resistor, coupled in series with the second controllable current source serially to provide the second feedback signal.

12. The voltage regulator of claim 10, wherein the voltage generator comprises:

a controllable current source, configured to provide a current proportional to the output current;

a first resistor, having a first terminal and a second terminal, wherein the first terminal is coupled to the controllable current source and configured to provide the first feedback signal, and a resistance of the first resistor is controlled in response to the first signal with the first slope and the second signal with the second slope; and a second resistor, having a first terminal and a second terminal, wherein the first terminal is coupled to the second terminal of the first resistor and configured to provide the second feedback signal, and a resistance of the second resistor is controlled in response to the second signal with the second slope.

13. The voltage regulator of claim 10, wherein the voltage generator comprises:

a controllable current source, configured to provide a current proportional to the output current;

a first resistor, having a first terminal and a second terminal, wherein the first terminal is coupled to the controllable current source and configured to provide the second feedback signal, and a resistance of the first resistor is controlled in response to the first signal with the first slope and the second signal with the second slope; and a second resistor, having a first terminal and a second terminal, wherein the first terminal is coupled to the second terminal of the first resistor and configured to provide the first feedback signal, and a resistance of the second resistor is controlled in response to the first signal with the first slope.

14. The voltage regulator of claim 10, wherein the voltage generator comprises:

a controllable current source, configured to provide a current proportional to the output current;

a resistor, having a first terminal coupled to the controllable current source and a second terminal coupled to a voltage sense signal representative of the output voltage, the resistor comprises a plurality of taps;

a first multiplexer, coupled to the plurality of taps, the first multiplexer is configured to choose one of the plurality of taps to provide the first feedback signal based on the first slope; and a second multiplexer, coupled to the plurality of taps, the second multiplex is configured to choose one of the plurality of taps to provide the second feedback signal based on the second slope.

15. A control method used in a voltage regulator, the voltage regulator is configured to receive an input voltage and provide an output voltage and an output current, the control method comprising:
- sensing the output current and the output voltage;
- generating a first feedback signal in response to the output voltage, the output current and a first signal with a first slope, and generating a first comparison signal by comparing the first feedback signal with a first reference voltage;
- generating a second feedback signal in response to the output voltage, the output current and a second signal with a second slope, and generating a second comparison signal by comparing the second feedback signal with a second reference voltage;
- generating a set signal based on the first comparison signal and the second comparison signal; and
- adjusting the output voltage based on the set signal, such that the output voltage decreases with the first slope as the output current increases when the output current is less than a predetermined current, and the output voltage decreases with the second slope as the output current increases when the output current is larger than the predetermined current.

16. The control method of claim 15, further comprising controlling the set signal to be logic high when any of the first comparison signal or the second comparison signal becomes is at logic high if the first slope is larger than the second slope.

17. The control method of claim 15, further comprising controlling the set signal to be logic high only when both of the first comparison signal and the second comparison signal are at logic high if the second slope is larger than the first slope.

18. The control method of claim 15, wherein the first slope or the second slope is equal to zero.

* * * * *